United States Patent
Fimeri et al.

(10) Patent No.: US 10,981,509 B2
(45) Date of Patent: Apr. 20, 2021

(54) DRIVE MECHANISM AND REAR VIEW DEVICE

(71) Applicant: SMR Patents S.à.r.l., Luxembourg (LU)

(72) Inventors: Garry Fimeri, Lonsdale (AU); James Dickson, Lonsdale (AU); Simon Orme, Lonsdale (AU)

(73) Assignee: SMR Patents S.à r.l., Luxembourg (LU)

( * ) Notice: Subject to any disclaimer, the term of this patent is extended or adjusted under 35 U.S.C. 154(b) by 0 days.

(21) Appl. No.: 16/612,100

(22) PCT Filed: May 4, 2018

(86) PCT No.: PCT/EP2018/061585
§ 371 (c)(1),
(2) Date: Nov. 8, 2019

(87) PCT Pub. No.: WO2018/206458
PCT Pub. Date: Nov. 15, 2018

(65) Prior Publication Data
US 2020/0164805 A1 May 28, 2020

(30) Foreign Application Priority Data

May 11, 2017 (AU) .................... 2017901755

(51) Int. Cl.
*B60R 1/07* (2006.01)
*B60R 11/04* (2006.01)
(Continued)

(52) U.S. Cl.
CPC ............. *B60R 1/07* (2013.01); *B60R 11/04* (2013.01); *F16D 11/14* (2013.01); *B60R 2011/0085* (2013.01)

(58) Field of Classification Search
CPC .. B60R 2011/0085; B60R 1/076; B60R 1/074
(Continued)

(56) References Cited

U.S. PATENT DOCUMENTS

| 4,728,181 A | 3/1988 | Kakinuma |
| 6,109,586 A * | 8/2000 | Hoek ..................... B60R 1/076 248/476 |

(Continued)

FOREIGN PATENT DOCUMENTS

JP    H11 240385 A    9/1999

OTHER PUBLICATIONS

International Search Report dated Jul. 16, 2018 of International application No. PCT/EP2018/061585.
(Continued)

*Primary Examiner* — Muhammad Ijaz
(74) *Attorney, Agent, or Firm* — Jones Day

(57) ABSTRACT

A drive mechanism for an external rear view device to be fitted to a motor vehicle includes a vehicle mountable frame base, a frame arm for accommodating the external rear view device rotatable with respect to the frame base about a first axis, a drive coupling rotatable with respect to the frame base about a second axis, and a drive shaft operably connected to the drive coupling by a first connection and operably connected to the frame arm by a second connection.

8 Claims, 26 Drawing Sheets

(51) Int. Cl.
*F16D 11/14* (2006.01)
*B60R 11/00* (2006.01)

(58) Field of Classification Search
USPC .................................... 248/466, 474, 476
See application file for complete search history.

(56) References Cited

U.S. PATENT DOCUMENTS

| | | | |
|---|---|---|---|
| 7,314,285 B2* | 1/2008 | Ruse .................... | B60R 1/0617 |
| | | | 248/479 |
| 7,448,762 B2* | 11/2008 | Su ......................... | B60R 1/076 |
| | | | 248/478 |
| 9,827,913 B2* | 11/2017 | De Wind ................. | B60R 1/07 |
| 9,969,334 B2* | 5/2018 | De Wind ................ | B60R 1/074 |
| 10,913,395 B2* | 2/2021 | De Wind ................ | B60R 1/062 |
| 2004/0218297 A1 | 11/2004 | Sakata et al. | |
| 2009/0040639 A1* | 2/2009 | Onuki .................... | B60R 1/074 |
| | | | 359/877 |
| 2019/0047474 A1* | 2/2019 | Asai ....................... | B60R 1/074 |
| 2020/0164805 A1* | 5/2020 | Fimeri ................... | B60R 1/074 |

OTHER PUBLICATIONS

Written Opinion dated Jul. 16, 2018 of International application No. PCT/EP2018/061585.

* cited by examiner

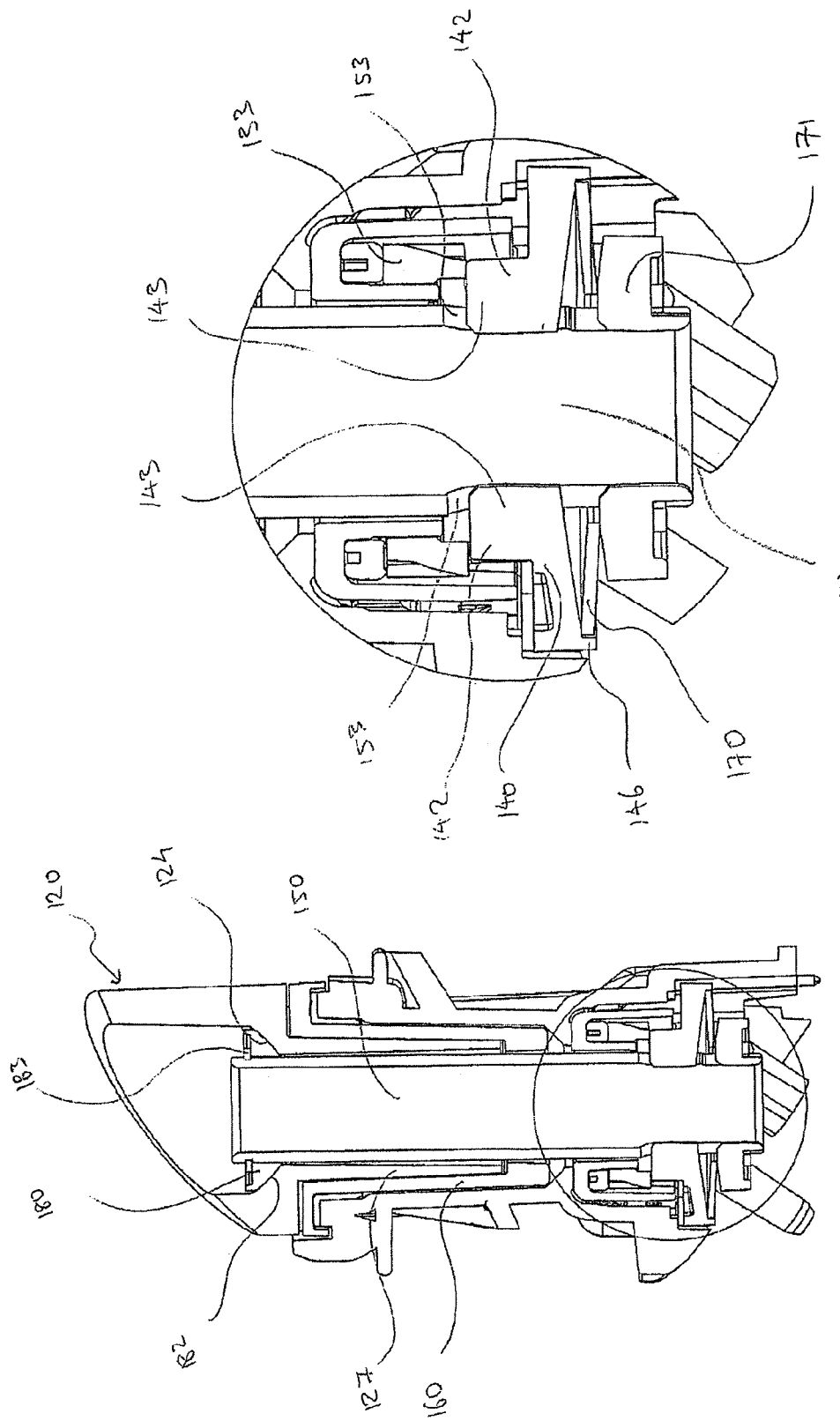

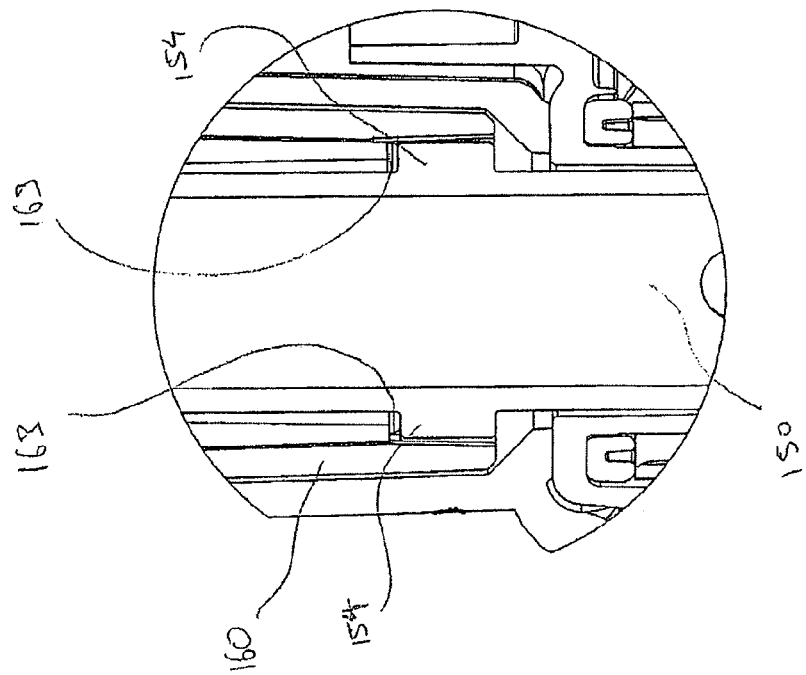
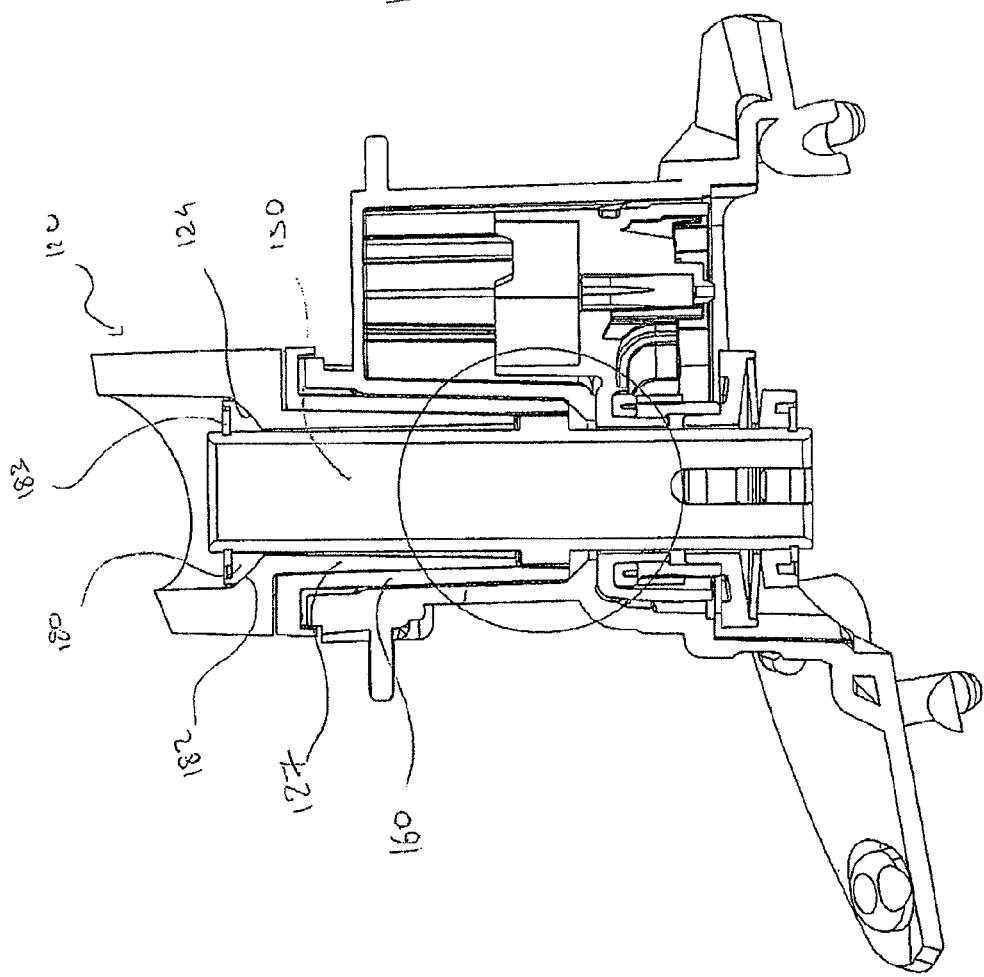

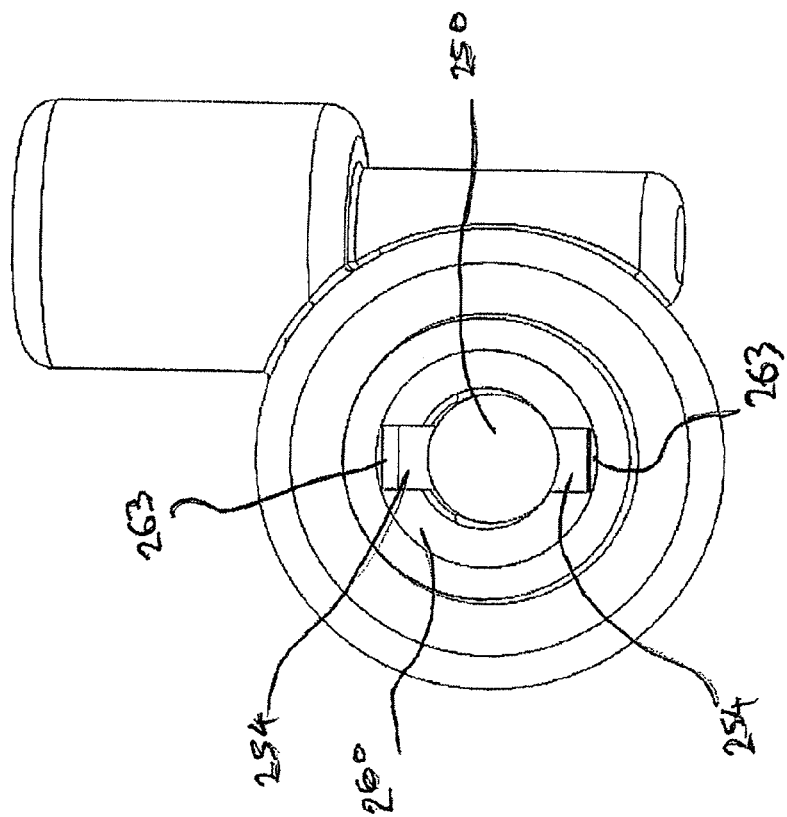
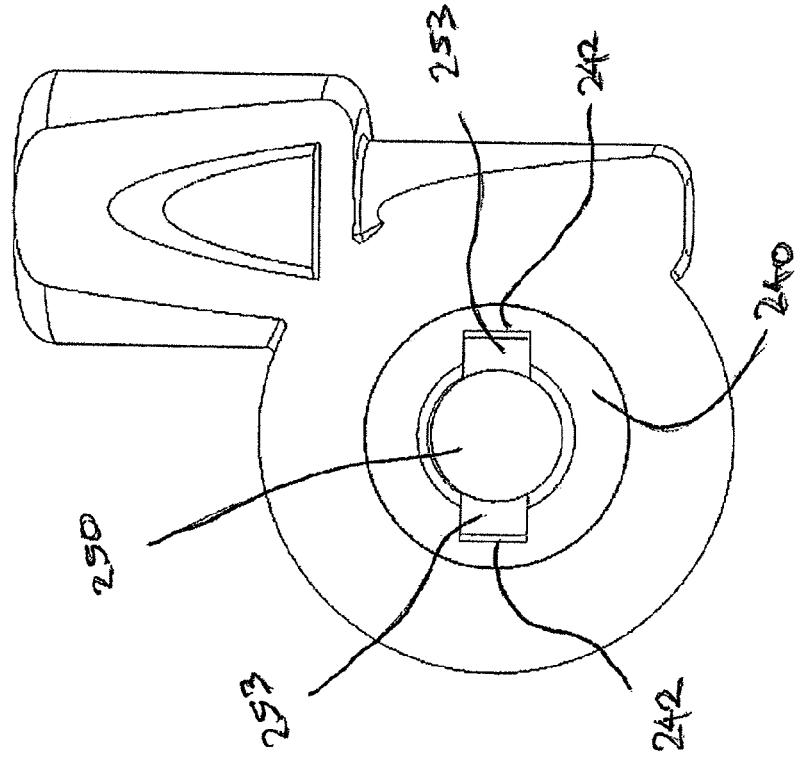

DRIVE MECHANISM AND REAR VIEW DEVICE

CROSS-REFERENCE TO RELATED APPLICATIONS

This application is a National Stage Entry of International Patent Application No. PCT/EP2018/061585, filed May 4, 2018, which claims the benefit of priority to Australian Patent Application No. AU 2017901755, filed May 11, 2017, each of which is hereby incorporated by reference in its entirety for all purposes.

BACKGROUND

1. Field of the Invention

The present disclosure relates to a drive mechanism. For example, a drive mechanism for an external rear view device to be fitted to a motor vehicle. It also relates to an external rear view device with a drive mechanism.

2. Related Art

Vehicle rear view systems, in particular vehicle exterior rear view systems, commonly include a housing for a rear view device such as a mirror assembly and/or camera and/or sensor that is pivotally attached to a mounting bracket via a frame arm. The mounting bracket is secured to the vehicle body (for instance, the door or front fender). The pivot enables the housing to rotate with respect to the bracket to either allow movement of the housing in response to an impact while the vehicle is moving or stationary (referred to as "mirror breakaway"), or to move to a parked position to ensure that the housing is moved to a position where it is as close the vehicle body as possible.

A detent is typically included in a pivot mechanism within the vehicle mirror described above. The detent provides a positive location and holding torque for the housing in at least a deployed or drive position as it is rotated about the pivot. The detent resists initial movement of the pivot and requires a defined torque (or force at a particular location) in order to overcome the detent holding torque.

It is desirable that the movement of the housing can be achieved by an electrically or power operated drive mechanism, including a drive means, to avoid the necessity for a driver or passenger to manually move the housing.

Drive means have typically been accommodated within the housing and are packaged behind the mirror assembly. With the advent of rear view cameras and ultrasonic sensors, automotive manufacturers are designing rear view systems without mirrors, having streamlined housings, meaning that conventional packaging of the drive means is impossible.

It is also desirable that the housing be subjected to impact without transmitting substantial, damaging loads to the drive means, while ensuring that the housing is stably and precisely located under normal driving conditions.

SUMMARY

According to a first aspect, a drive mechanism for an external rear view device to be fitted to a motor vehicle includes a vehicle mountable frame base, a frame arm for accommodating the external rear view device, rotatable with respect to the frame base about a first axis, a drive coupling rotatable with respect to the frame base about a second axis, and a drive shaft, operably connected to the drive coupling by a first connection, and operably connected to the frame arm by a second connection, such that the drive shaft is capable of transferring rotational movement from the drive coupling to the frame arm. The frame arm and drive shaft are movable such that the first axis and second axis are movable with respect to each other.

In certain embodiments, the first connection allows the drive shaft to be moveable with respect to the drive coupling.

In certain embodiments, the first connection includes a pair of drive dogs configured to locate within a pair of slots shaped to receive the drive dogs, wherein rotational drive is transferable between the drive dogs and the slots.

In certain embodiments, the pair of drive dogs are disposed on the drive coupling and the pair of slots are disposed on the drive shaft.

In certain embodiments, the pair of drive dogs are disposed on the drive shaft and the pair of slots are disposed on the drive coupling.

In certain embodiments, the second connection allows the drive shaft to be misaligned with respect to the frame arm.

In certain embodiments, the second connection includes a clutch coupling, which transfers rotational drive between the drive shaft and the frame arm.

In certain embodiments, the second connection further includes a pair of drive dogs configured to locate within a pair of slots shaped to receive the drive dogs, wherein rotational drive is transferable between the drive dogs and the slots.

In certain embodiments, the pair of drive dogs are disposed on the drive shaft and the pair of slots are disposed on the clutch coupling.

In certain embodiments, the pair of drive dogs are disposed on the clutch coupling and the pair of slots are disposed on the drive shaft.

In certain embodiments, the drive mechanism further includes a powerfold actuator for creating relative rotation between the drive coupling and the frame base.

According to a second aspect, there is provided an external rear view device with a drive mechanism.

It is also proposed that the frame arm accommodates a housing for at least one reflective element, in particular in form of a mirror, a camera and/or sensor.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 9B is a cross sectional view of the drive mechanism taken through the line X-X of FIG. 9A;

FIG. 9C is a detail view of FIG. 9B;

FIG. 9D is a cross sectional view of the drive mechanism taken through the line Y-Y of FIG. 9A;

FIG. 9E is a detail view of FIG. 9D;

FIG. 22 is a cross sectional view taken through the line C-C of FIG. 21, detailing the clearance relationship between the drive coupling and the drive shaft; and FIG. 23 is a cross sectional view taken through the line D-D of FIG. 21, detailing the clearance relationship between the drive shaft and the clutch coupling.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Figure 1:
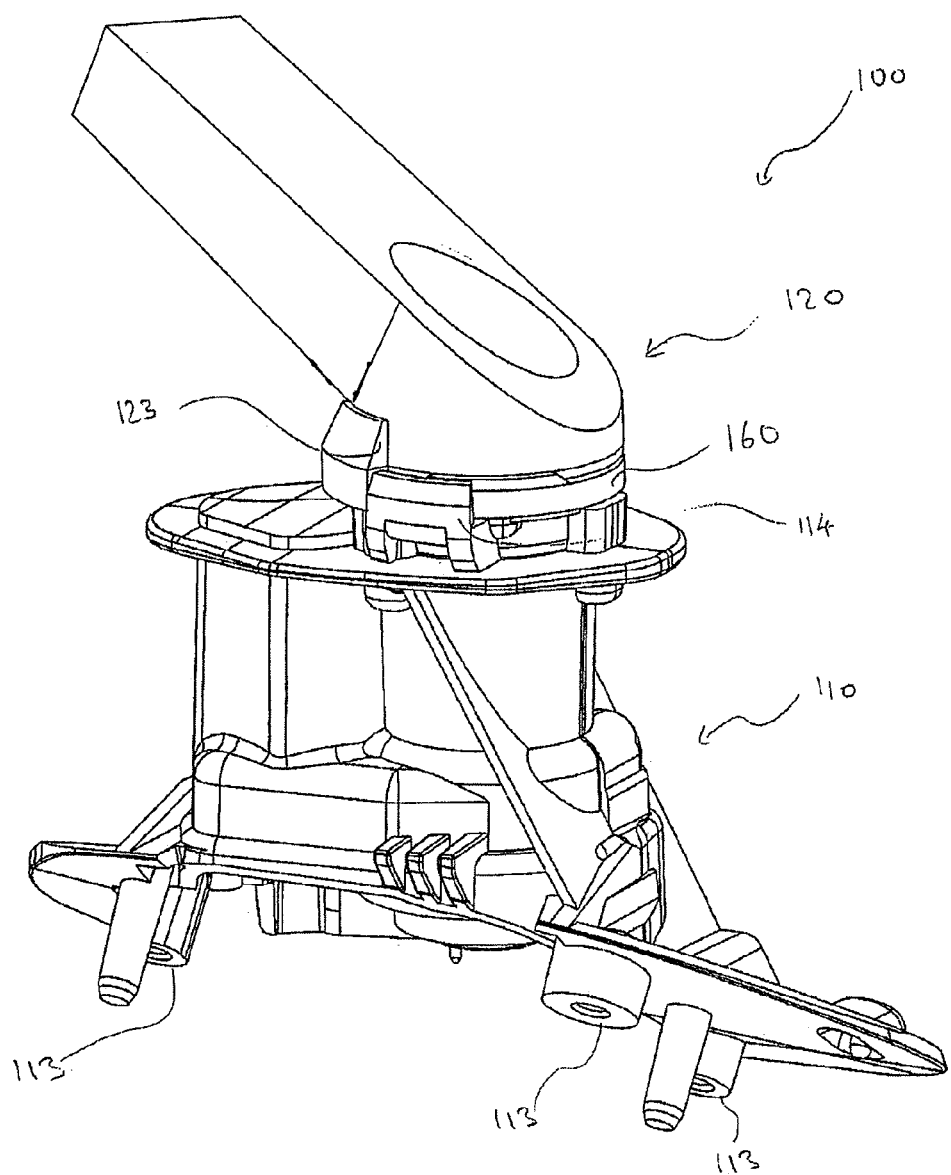
FIG. 1 is an isometric side view of a drive mechanism, according to an embodiment, in a parked position.
Figure 2:
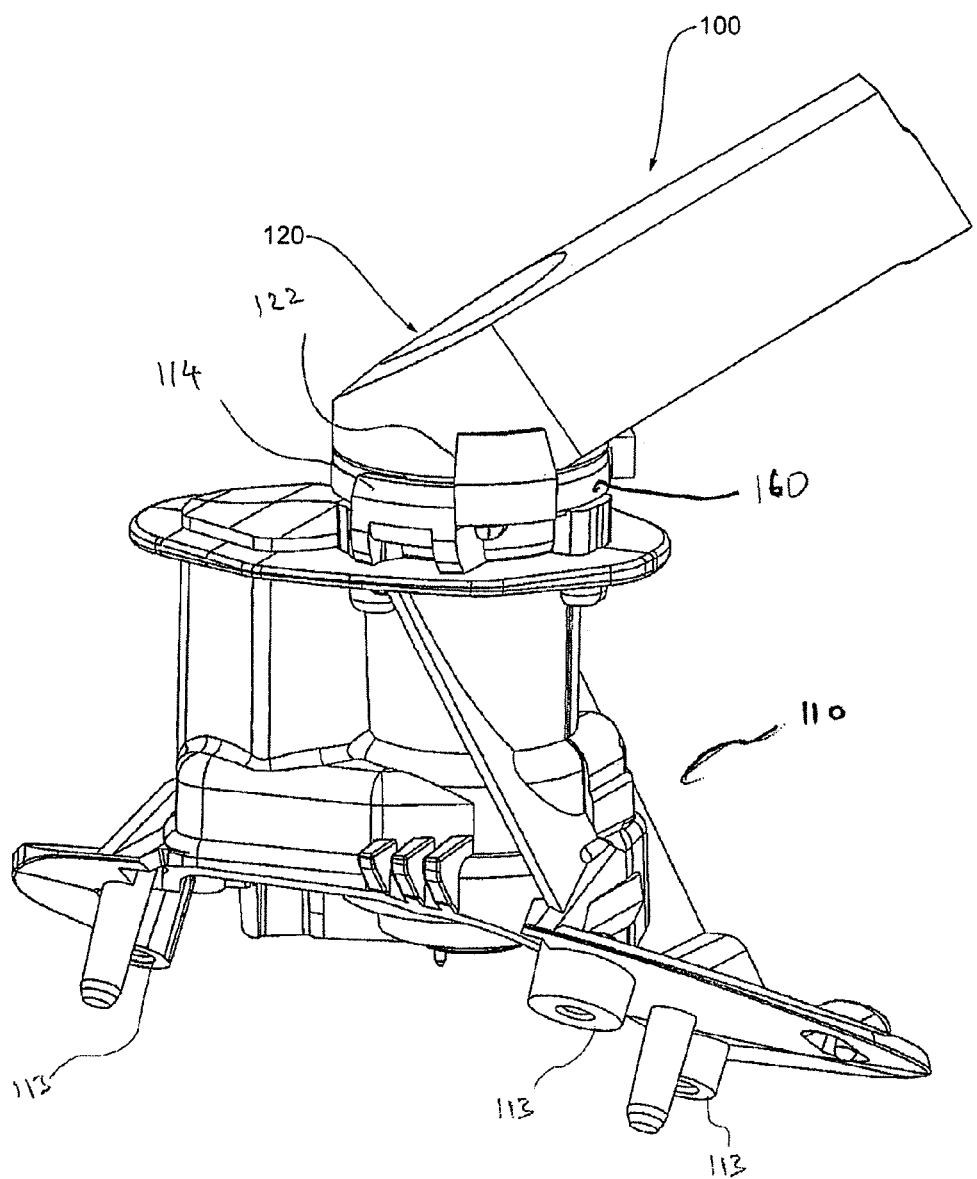
FIG. 2 is an isometric side view of the drive mechanism of FIG. 1, in a forward position.
Figure 3:
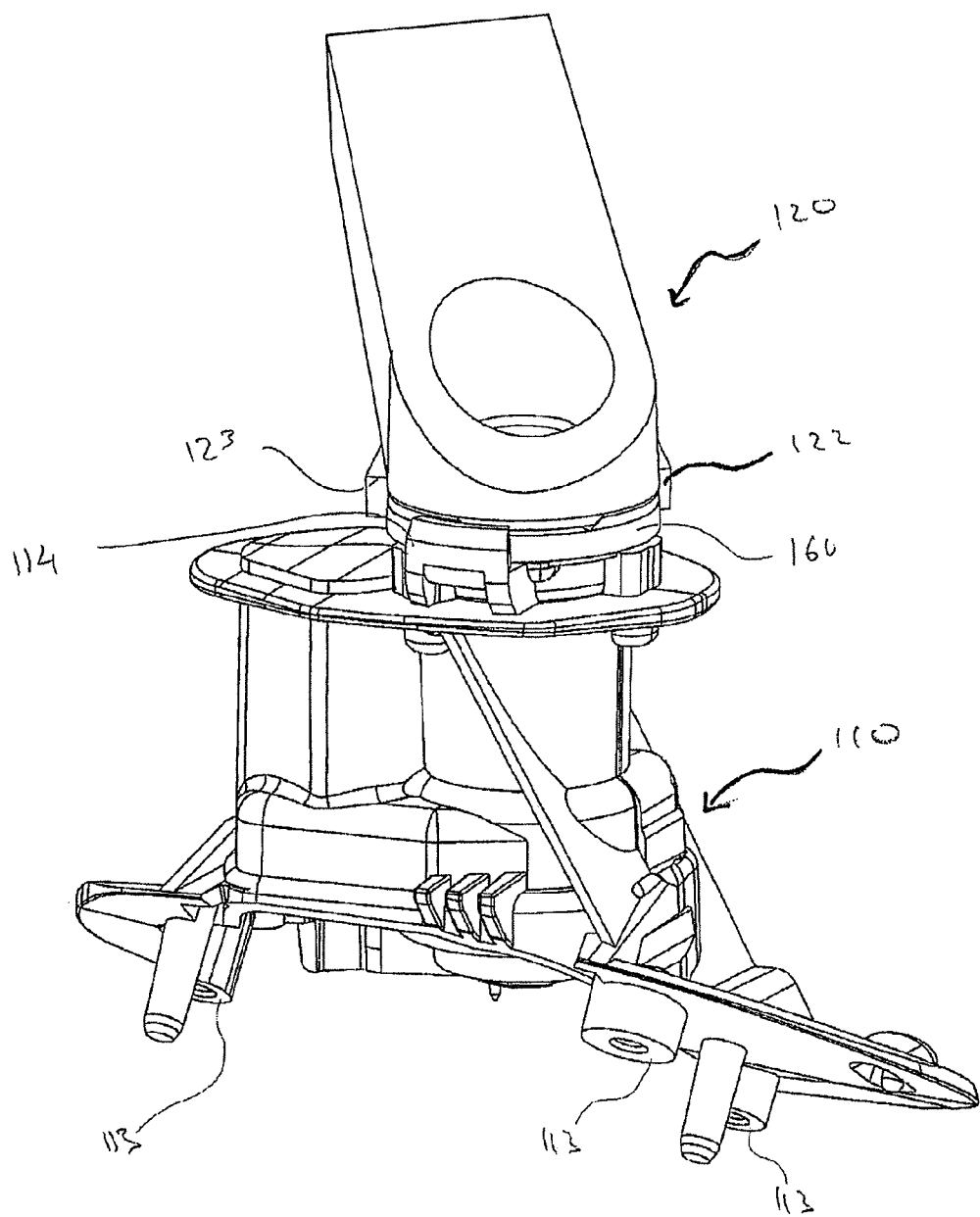
FIG. 3 is an isometric side view of the drive mechanism of FIG. 1, in a deployed position.

Referring now to FIGS. 1, 2 and 3, there is shown a side view of a drive mechanism 1, according to an embodiment, in forward, parked and deployed positions, respectively.

The drive mechanism 100, includes a frame base 110, which is mountable to a vehicle via mounting points 113, and a frame arm 120, for accommodating a housing for an exterior rear view device such as a mirror and/or rear facing camera and/or sensor(s), the frame arm 120, being rotatable with respect to the frame base 110.

The frame base 110 has a stop 114 which interacts with corresponding forward and parked stop surfaces 122, 123 on the frame arm 120. The stop 114 and the forward stop surface 122 interact to prevent the frame arm 120 from rotating beyond a forward point when the frame arm 120 is rotated forward with respect to the frame base 110, as shown in FIG. 1. The stop 114 and the parked stop surface 123 interact to prevent the frame arm 120 from rotating beyond a rearward point when the frame arm 120 is rotated rearward with respect to the frame base 110, as shown in FIG. 2.

The deployed position, as shown in FIG. 3, is when the frame arm 120 is rotated to a position relative to the frame base 110 which is intermediate the forward and parked positions. This is the position that allows the rear view device to be used under normal driving conditions.

Figure 4:
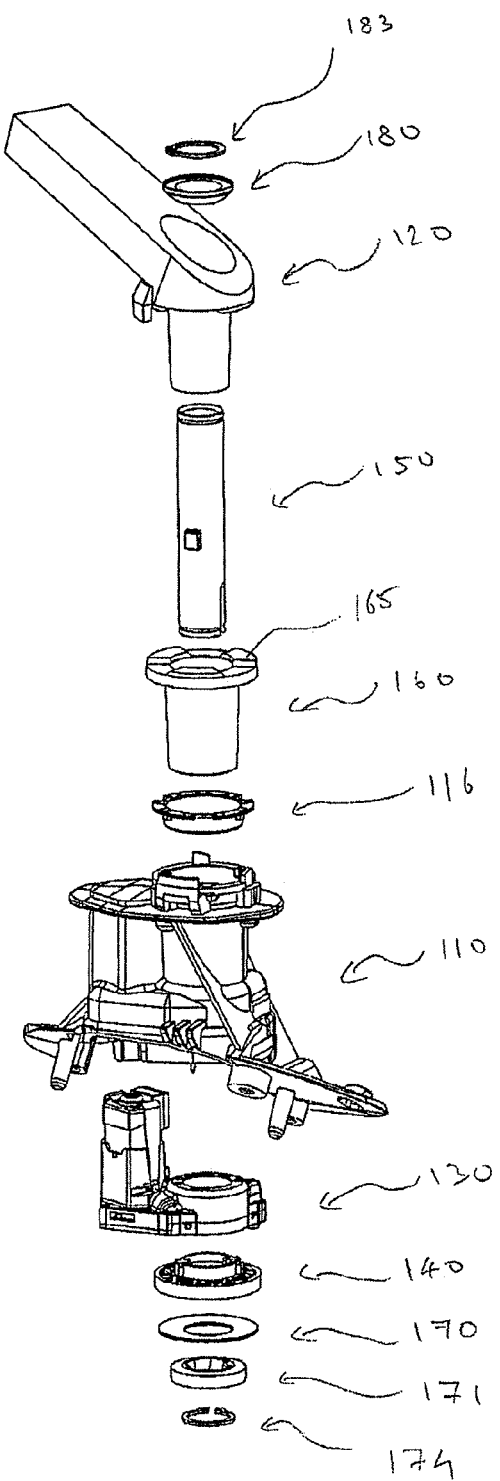
FIG. 4 is a top isometric exploded assembly drawing of the drive mechanism.
Figure 5:
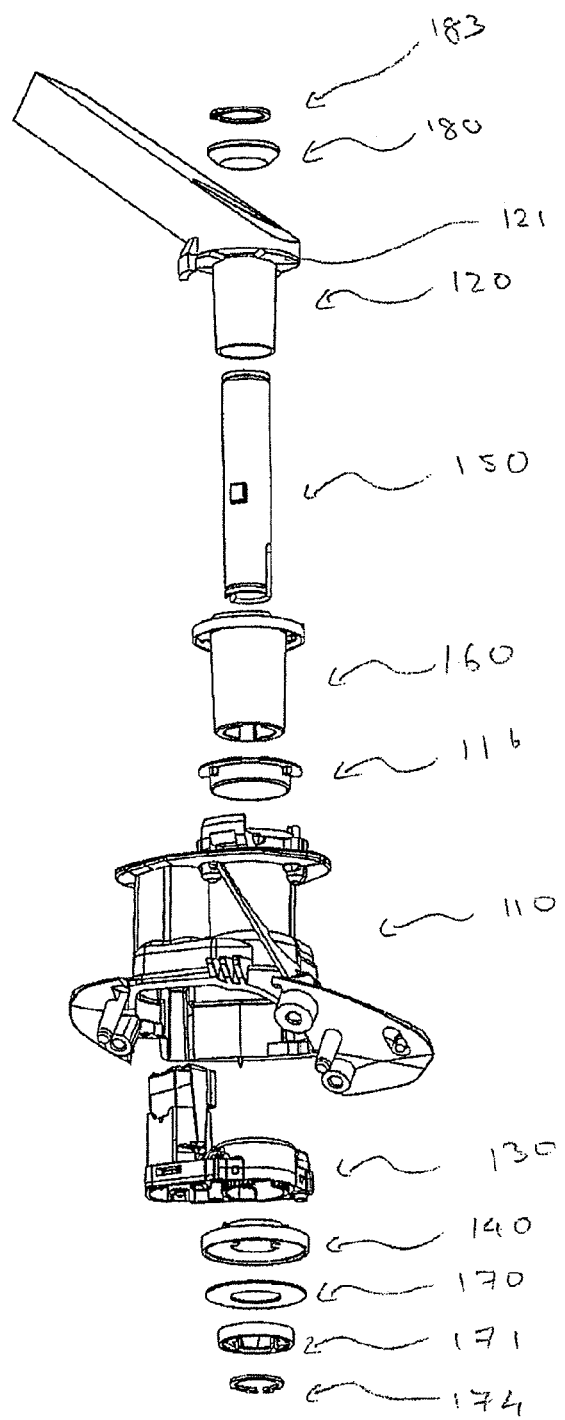
FIG. 5 is a bottom isometric exploded assembly drawing of the drive mechanism of FIG. 4.

FIGS. 4 and 5 show exploded assembly views of the drive mechanism 100 which is now explained in more detail.

Figure 6:
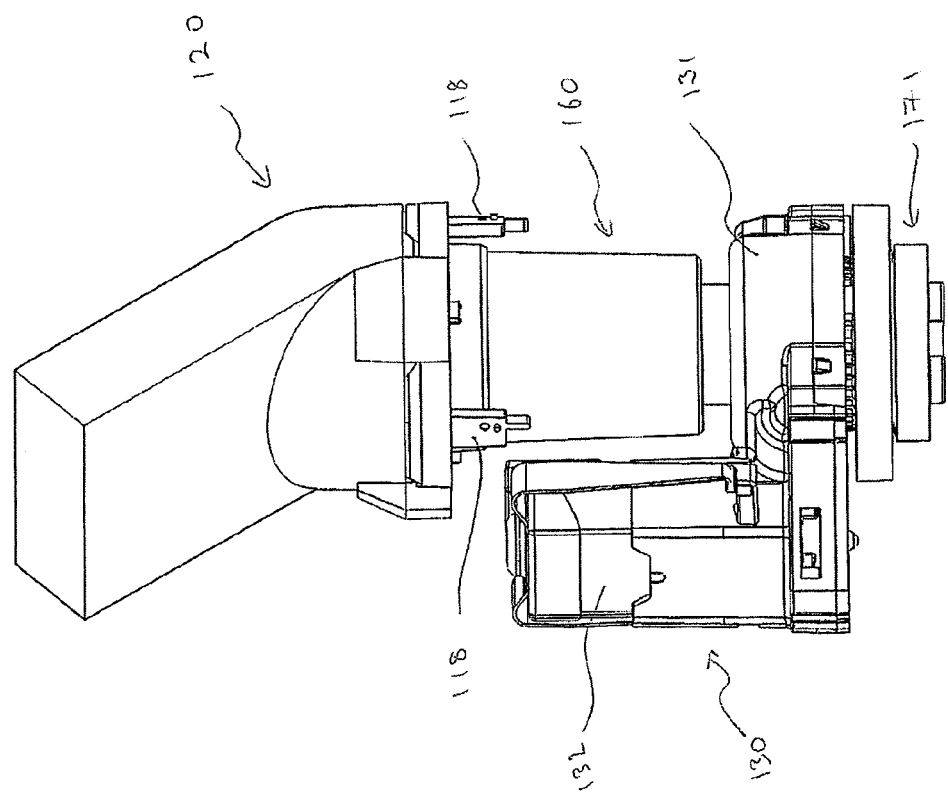
FIG. 6 is a side view of the drive mechanism with the frame base removed to reveal the powerfold actuator.
Figure 7A:
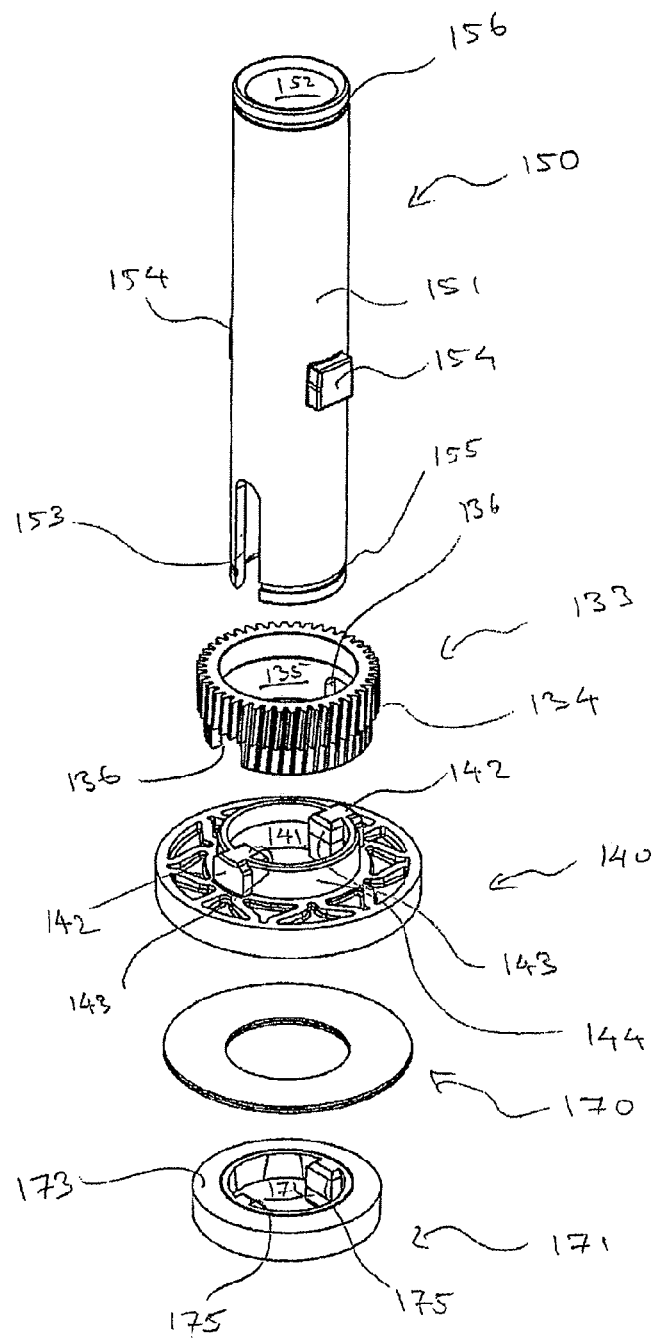
FIG. 7A is a top isometric exploded assembly drawing detailing the relationship between the main gear, drive coupling, drive shaft, spring and spring retainer.
Figure 7B:
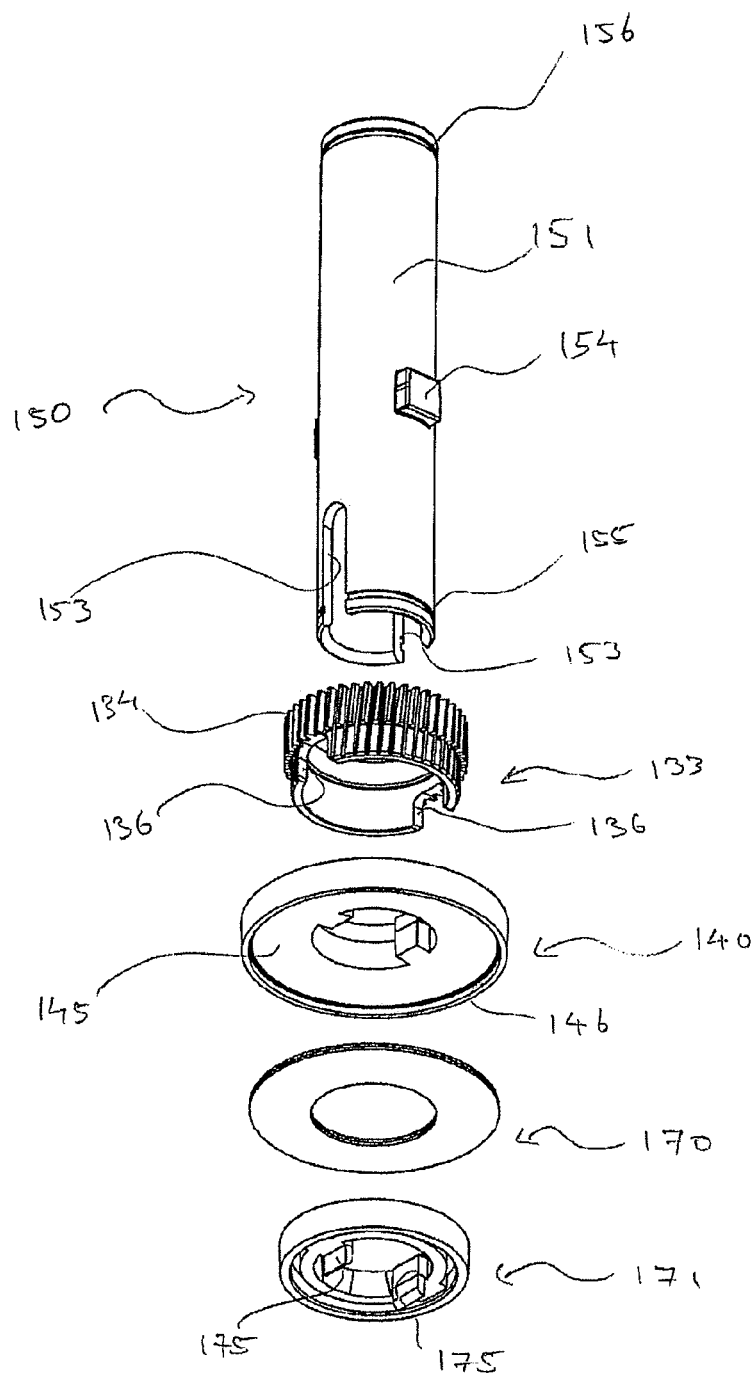
FIG. 7B is a bottom isometric exploded assembly drawing detailing the relationship between the main gear, drive coupling, drive shaft, spring and spring retainer.

The frame arm 120 is able to be rotatably driven by a number of components which are connected with a powerfold actuator 130. The powerfold actuator 130 (best shown in FIG. 6) includes an electric motor 132 which drives a series of worm shafts and gears (not shown) which drive a main gear 133 (best shown in FIGS. 7A and 7B) which in turn drives a drive coupling 140 which in turn drives a drive shaft 150 which in turn drives a clutch coupling 160. The clutch coupling 160 is shown in more detail in FIG. 8 and has detent features 165 at a first end, which are complimented by detent features 121 on the frame arm 120. The frame arm 120 is biased toward the clutch coupling 160 via a tension arrangement applied by a compressible spring in the form of a disc spring 170 (in alternate embodiments it could be any type of spring including a coil spring), such that the detent features 165, 121 are biased toward each other to form a complimentary detent arrangement where rotation of the clutch coupling 160 will result in rotation of the frame arm 120. A more detailed explanation of the various components is provided below.

Figure 8:
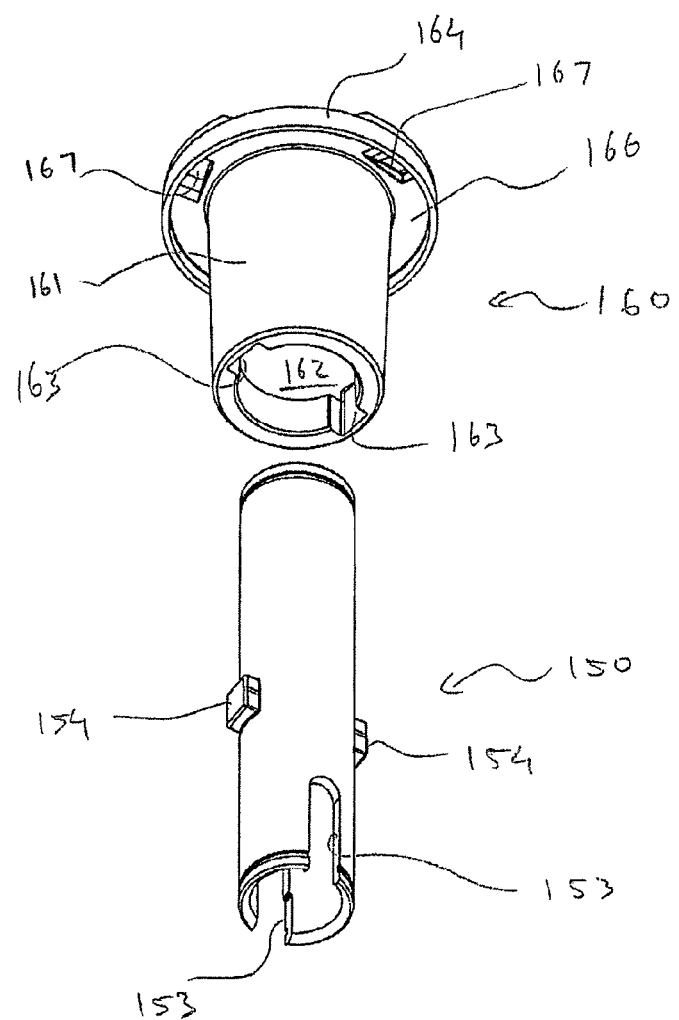
FIG. 8 is a bottom isometric exploded assembly drawing detailing the relationship between the drive shaft and the clutch coupling.
Figure 10:
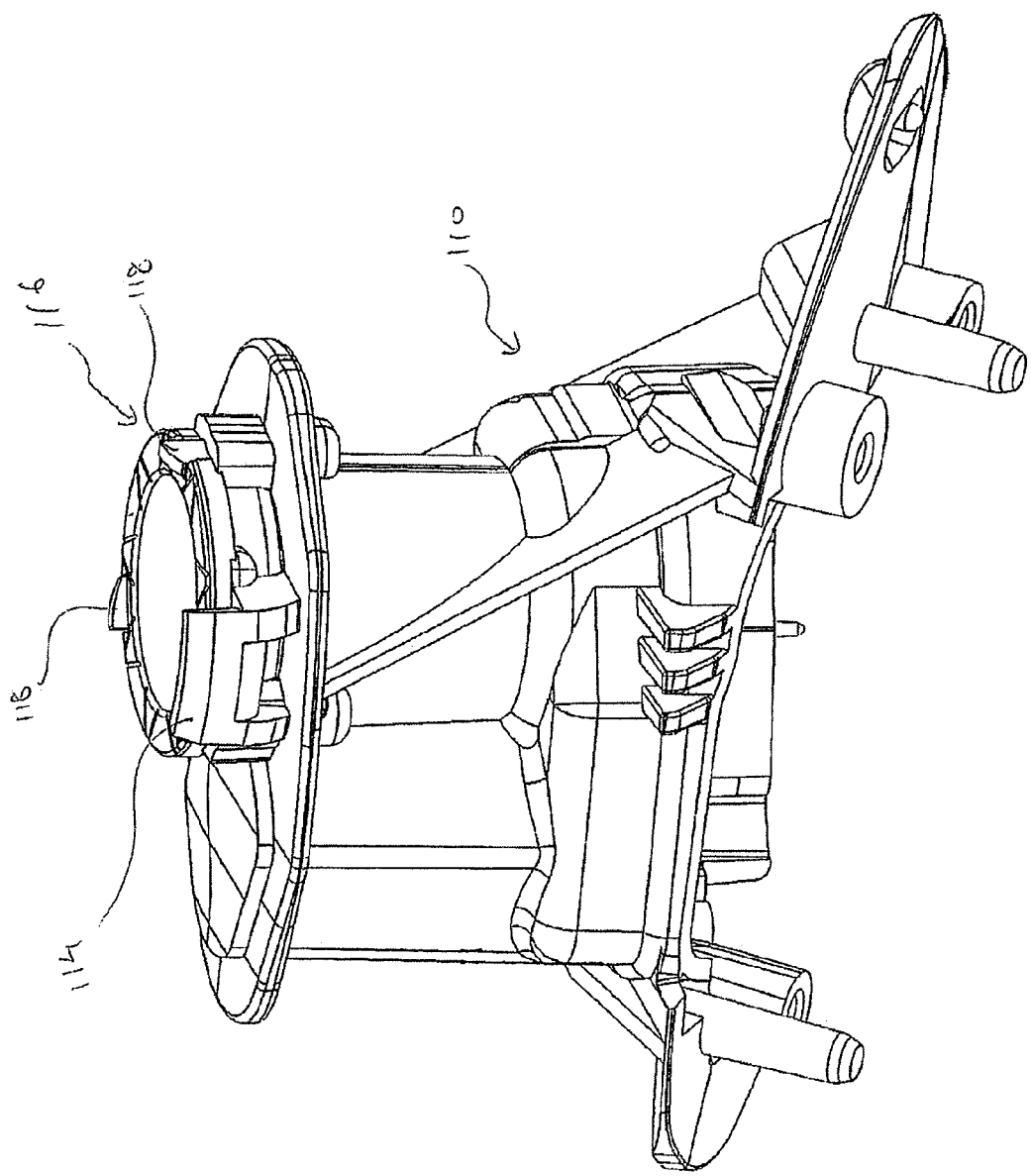
FIG. 10 is a side view of a partial assembly of the base frame, bearing and pawls.
Figure 11:
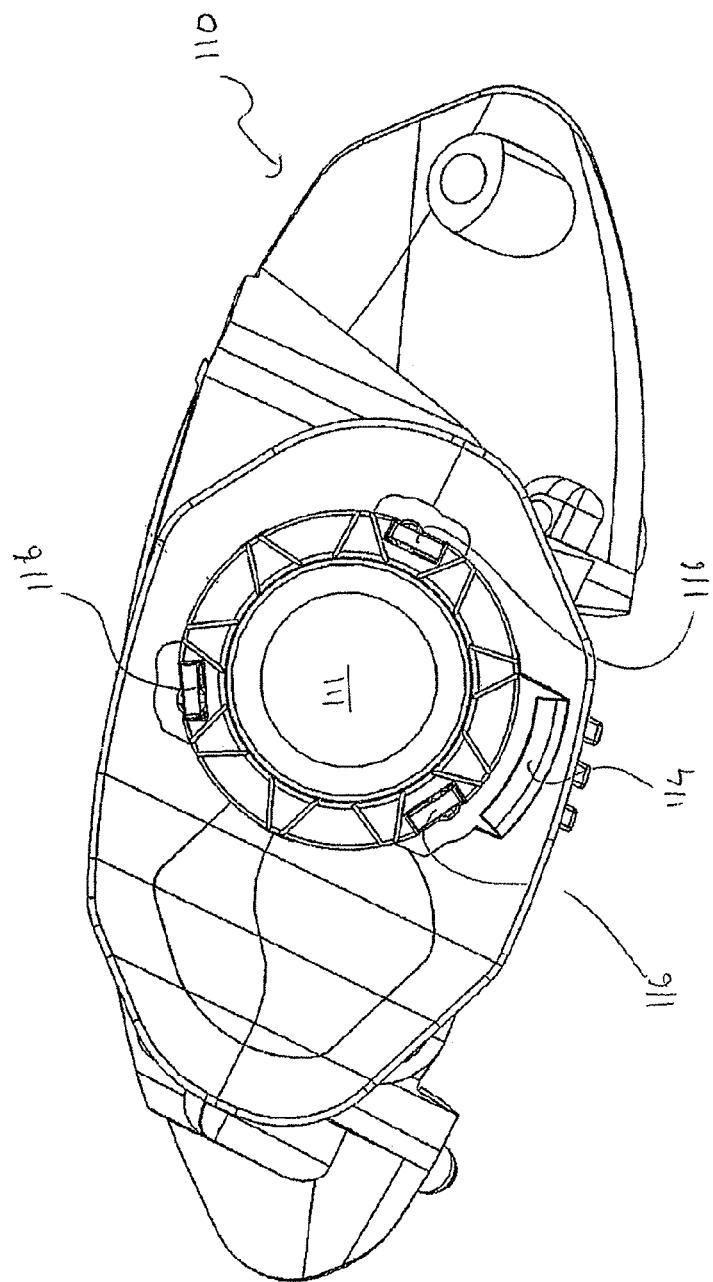
FIG. 11 is a top view of the partial assembly of FIG. 10.
Figure 12:
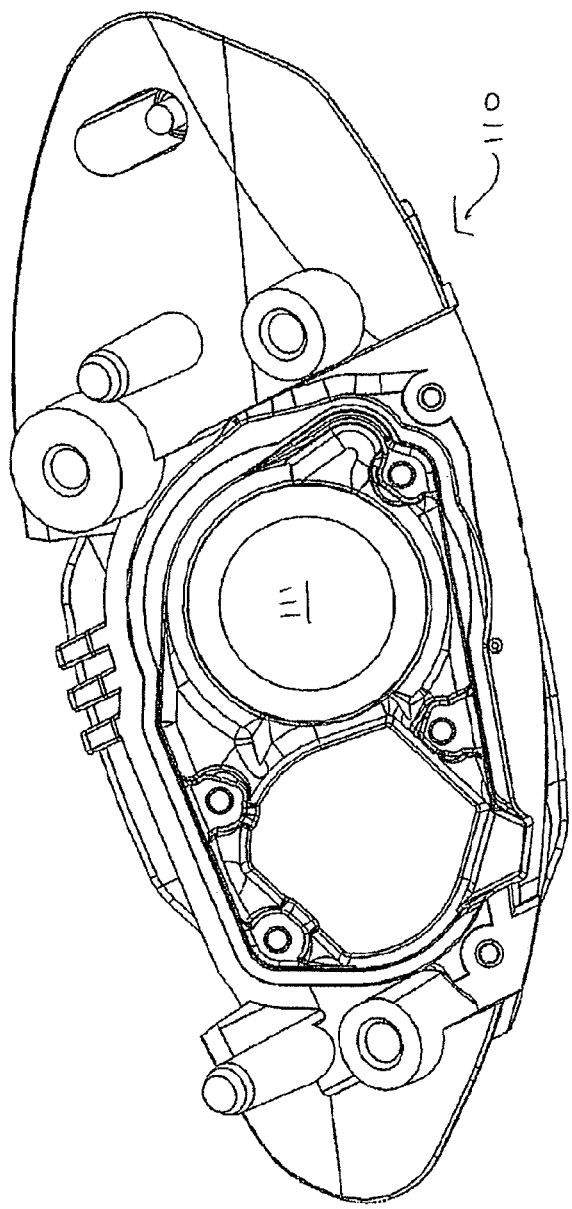
FIG. 12 is a bottom view of the partial assembly of FIG. 10.
Figure 13A:
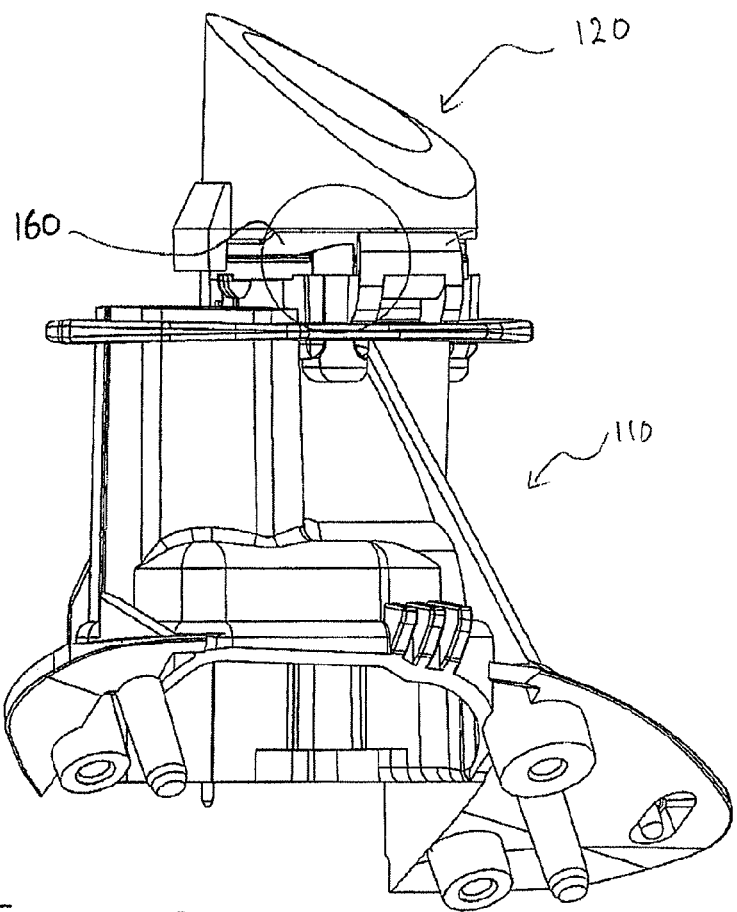
FIG. 13A is a side view of a partial assembly of the drive mechanism of FIG. 1, detailing the relationship between the pawls and the clutch coupling.
Figure 13B:
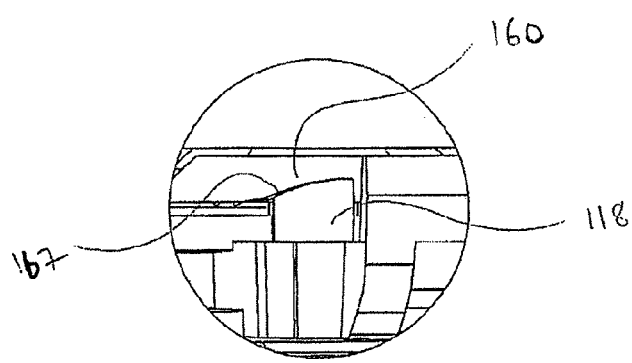
FIG. 13B is a detail view of FIG. 13A.

FIGS. 13A and 13B illustrate how the drive mechanism 100 prevents the clutch coupling 160 from rotating beyond a defined angle of rotation in a forward direction. This is achieved by three pawls 118 (best shown in FIGS. 10 and 11) which are equispaced around the bore 111 of the frame base 110, and are housed within recesses in the frame base 110 and mounted on springs (not shown) which bias the pawls 118 toward the bottom surface 166 of the clutch coupling 160. The bottom surface 166 of the clutch coupling 160 is supported by the low friction surface provided by the bearing 116 which is located at the opening of the bore 111 of the frame base 110. The bottom surface 166 features three complimentary ratchet features 167 (as best shown in FIG. 8) equispaced around the bore 162 of the clutch coupling 160. In use, the shape of the pawls 118 and ratchet features 166 are configured to allow the clutch coupling 160 to rotate freely in a rearward direction, but prevent it from rotating any further than the deployed position in the forward direction by virtue of the spacing of the pawls 118 and ratchet features 167 around the axis of rotation.

In ordinary use, the frame arm 120 can be rotated by the powerfold actuator 130 between the parked position, where the stop 114 has prevented the frame arm 120 from rotating beyond a rearward point, and the deployed position, where the pawls 118 and ratchet features 167 prevent the clutch coupling 160 from rotating beyond the deployed position. In both cases, the increase in current draw from the electric motor 132 associated with the frame arm 120 reaching its parked position, or the clutch coupling 120 being prevented from further forward rotation, will be detected and the electric motor 132 will be stopped.

The drive mechanism 100 is also configured to allow the frame arm 120 to manually "break away" from the deployed position when an external rotational force is applied to the frame arm 120. In the event of an external rotation force being applied to the frame arm 120, the powerfold actuator 130 will resist rotation, and the ramped faces of the detent features 121, 165 allow the frame arm 120 to move axially away from the clutch coupling 160, against the bias of the spring 170 and to rotate forward or rearward toward the forward position or the parked position respectively. The biasing of the frame arm 120 toward the clutch coupling 160 creates a frictional force between the detent features 121, 165, despite being broken away, such that if the powerfold actuator 130 was to rotate the clutch coupling 160, the frame arm 120 would still be driven by the clutch coupling 160.

In the event that the frame arm 120 has been broken away from its deployed position, it is capable of being returned to its deployed position manually, or through use of the powerfold actuator 130. When returned manually, an external rotation force greater than the frictional force between the detent features 121, 165 is applied to the frame arm 120. As the clutch coupling 160 is already in the deployed position, the frame arm 120 can simply be rotated back toward the deployed position, where the detent arrangement will correctly locate it in the deployed position.

When the frame arm 120 is returned using the powerfold actuator 130, the clutch coupling 160 is rotated rearward, which will also rotate the frame arm 120 until the stop 114 and the parked stop surface 123 come in to contact and prevent the frame arm 120 from rotating any further. If the frame arm detents 121 are disengaged from the clutch coupling detents 165, the clutch coupling 160 will continue to rotate against the frictional force between the detents 121, 165 until they re-engage, then the increased current draw will be detected and the electric motor 132 will be stopped. The direction of rotation of the powerfold actuator 130 will then be reversed such that the clutch coupling 160 rotates forward until the pawl 118 and ratchet features 167 prevents the clutch coupling 160 from rotating beyond its deployed position. The increased current draw will be detected and the electric motor 132 will be stopped.

While in this embodiment, pawls and ratchet features have been disclosed, it will be appreciated that any variation that provides a torsional/rotational ratcheting effect between the clutch coupling and frame base may be employed.

Referring again to FIGS. 7A and 7B, where there are shown exploded views detailing the relationship between the main gear 133, drive coupling 140, drive shaft 150, spring 170 and spring retainer 171. As briefly discussed above, the powerfold actuator 130 drives the main gear 133, which has a series of teeth 134 which are driven by a worm shaft (not shown). The main gear 133, has a bore 135 which allows the drive shaft 150 to pass through, and also allows a top ring 144 of the drive coupling 140 to locate therein. The main gear 133 further features two opposing slots 136 shaped to receive corresponding external opposing drive dogs 142 from the drive coupling 140. The slots 136 and external drive dogs 142 transfer rotational drive from the main gear 133 to the drive coupling 140.

The drive coupling 140 features a bore 141 which allows the drive shaft 150 to pass through, and also features internal opposing drive dogs 143 configured to locate within opposing slots 153 located on a first end of the drive shaft 150. The internal drive dogs 143 and the slots 153 transfer rotational drive from the drive coupling 140 to the drive shaft 150. The drive coupling 140 also features a bottom surface 145 and bottom flange 146 for supporting and retaining the spring 170.

Located below the spring 170 is the spring retainer 171, which features a bore 172 which allows the drive shaft 150 to pass through, and also features internal opposing drive dogs 175 which locate within the opposing slots 153 of the drive shaft 150. The internal drive dogs 175 and the slots 153 transfer rotational drive from the drive shaft 150 to the spring retainer 171. The spring retainer 171 also features a top surface 173 for supporting the spring 170.

The drive shaft 150 features a groove 155 at its first end, for accommodating a circlip 174 (best shown in FIGS. 4 and 5). FIGS. 9B and 9D show cross sectional views of the drive mechanism 100 and detail how the circlip 174 acts to hold the spring retainer 171, spring 170, and drive coupling 140 together at the first end of the drive shaft 150.

Figure 9A:
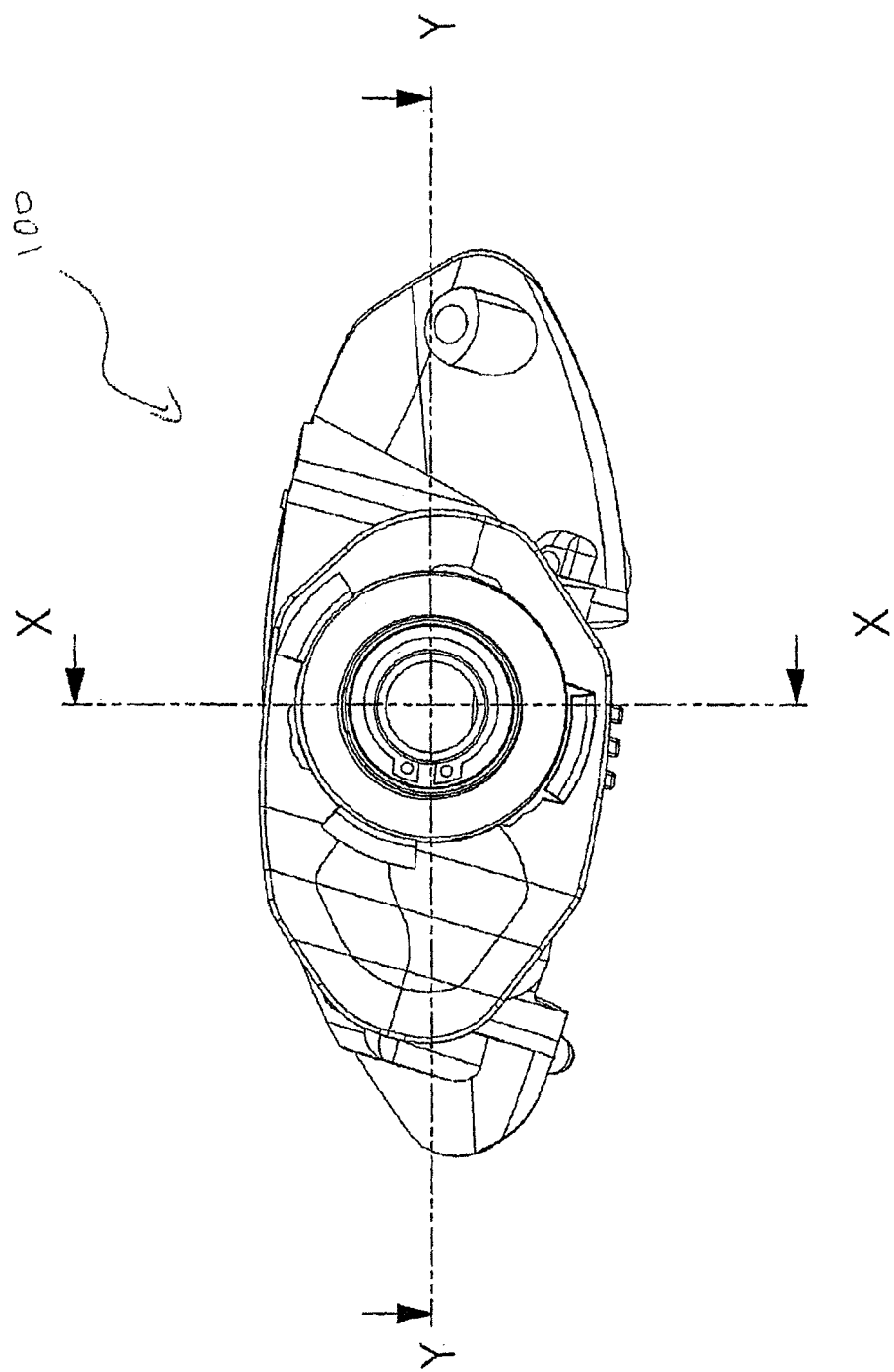
FIG. 9A is a top view of the drive mechanism of FIG. 1.

FIG. 9B shows a cross sectional view of the drive mechanism 100 taken through the line X-X as shown in FIG. 9A. FIG. 9C shows a detailed view of FIG. 9B, showing the coupling relationship between the main gear 133, drive coupling 140, drive shaft 150, spring 170 and spring retainer 171.

Referring now to FIG. 8, there is shown an exploded view detailing the relationship between the drive shaft 150 and the clutch coupling 160. The drive shaft 150 features two opposing external drive dogs 154 located at a position intermediate its first and second ends, and oriented orthogonally to the opposing slots 153 located at the first end of the drive shaft 150. The external drive dogs 154 are configured to be accommodated within two opposing recesses 163 located within the end of the shaft section 161 of the clutch coupling 160. The external drive dogs 154 and recesses 163 transfer rotational drive from the drive shaft 150 to the clutch coupling 160.

Referring now to FIG. 9D, where there is shown a cross sectional view of the drive mechanism 100 taken through the line Y-Y as shown in FIG. 9A, and FIG. 9E which shows a detailed view of FIG. 9D, showing the coupling relationship between the drive shaft 150 and the clutch coupling 160. It can be seen how the shaft section 161 of the clutch coupling 160 locates over the drive shaft 150 and external drive dogs 154. The shaft section 127 of the frame arm 120 then locates over the drive shaft 150 and inside the bore 162 of the clutch coupling 160. The frame arm 120 has a spherical alignment surface 124 which supports a frame arm retainer 180 which locates over the drive shaft 150 and has a complimentary spherical alignment surface 182 which bears against the spherical alignment surface 124 of the frame arm 120. The drive shaft 150 features a groove 156 at its second end, for accommodating a circlip 183. It can be seen in FIG. 9D how the circlip 183 acts to hold the frame arm retainer 180 and frame arm 120 together at the second end of the drive shaft 150.

It will be appreciated that the drive shaft 150 acts as a tensile member to transmit the force from the compressed spring 170 which has the effect of pulling the frame arm 120 toward the clutch coupling 160, ensuring that the frame arm 120 is stably and precisely located when in a deployed position. When the frame arm 120 is broken away from the clutch coupling 160, the spherical surface 124 of the frame arm 120 pushes against the spherical surface 182 of the frame arm retainer 180 and circlip 183 which pulls the drive shaft 150, bottom circlip 174 and spring retainer 171 and causes the spring 170 to further compress against the bottom surface 145 of the drive coupling 140.

While in this embodiment, circlips have been used to hold the frame arm retainer, spring retainer and drive shaft together, it is appreciated that in alternative embodiments, any variation that facilitates retention of the components could be employed.

The drive mechanism 100 is thus configured to accommodate for misalignment or displacement of various elements. The spherical joint formed between the frame arm retainer 180 and the frame arm 120, combined with the tapered bore 125 of the frame arm 120 allows the drive shaft 150 to articulate about the spherical joint. The degree of articulation of the drive shaft 150 with respect to the frame arm 120 is restricted by the clearance between the shaft body 151 and the inner surface of the tapered bore 125 of the frame arm 120.

While in this embodiment, a spherical joint between the drive shaft and frame arm has been disclosed, it will be appreciated that in alternative embodiments any variation that allows for articulation between the drive shaft and frame arm could be employed.

Referring again to FIG. 7A, it can be seen that the internal drive dogs 143 in the drive coupling 140 and the first end slots 153 in the drive shaft 150 engage with each other forming a first connection such that there is minimal rotational clearance (with respect to the axis of rotation of the drive shaft 150) but with substantial axial clearance (with respect to the axis of rotation of the drive shaft), such that the slots 153 of the drive shaft 150 can move axially relative to the internal drive dogs 143 of the drive coupling 140, and radial clearance (with respect to the axis of rotation of the drive shaft 150) such that the slots 153 and the drive shaft 150 can move radially along the internal drive dogs 143 of the drive coupling 140. The configuration of the slots 153 and the internal drive dogs 143 also allows the drive shaft 150 to pivot conically with respect to the drive coupling 140.

Similarly, the external drive dogs 154 of the drive shaft 150, and the internal recesses 163 of the clutch coupling 160 engage with each other to form a second connection means such that there is minimal rotational clearance (with respect to the axis of rotation of the drive shaft 150) but with substantial axial clearance (with respect to the axis of rotation of the drive shaft 150), such that the external drive dogs 154 of the drive shaft 150 can move axially relative to the internal recesses 163 of the clutch coupling 160, and radial clearance (with respect to the axis of rotation of the drive shaft 150) such that the external drive dogs 154 of the drive shaft 150 can move radially along the internal recesses 163 of the clutch coupling 160. The configuration of the external drive dogs 154 and the internal recesses 163 also allows the drive shaft 150 to pivot conically with respect to the axis of rotation of the clutch coupling 160.

The combined effect of the spherical joint, and clearances between drive dogs and slots/recesses, and the orthogonal relationship between the drive dogs and slots/recesses allows for rotational movement to be transferred from the drive coupling 140 to the frame arm 120 in circumstances where the drive coupling 140, clutch coupling 160 and frame arm 120 do not share a common axis of rotation. This concept is more readily represented in FIGS. 14 to 23 where there is shown a diagrammatic representation of a simplified drive mechanism 200 according to an alternative embodiment.

Figure 14:
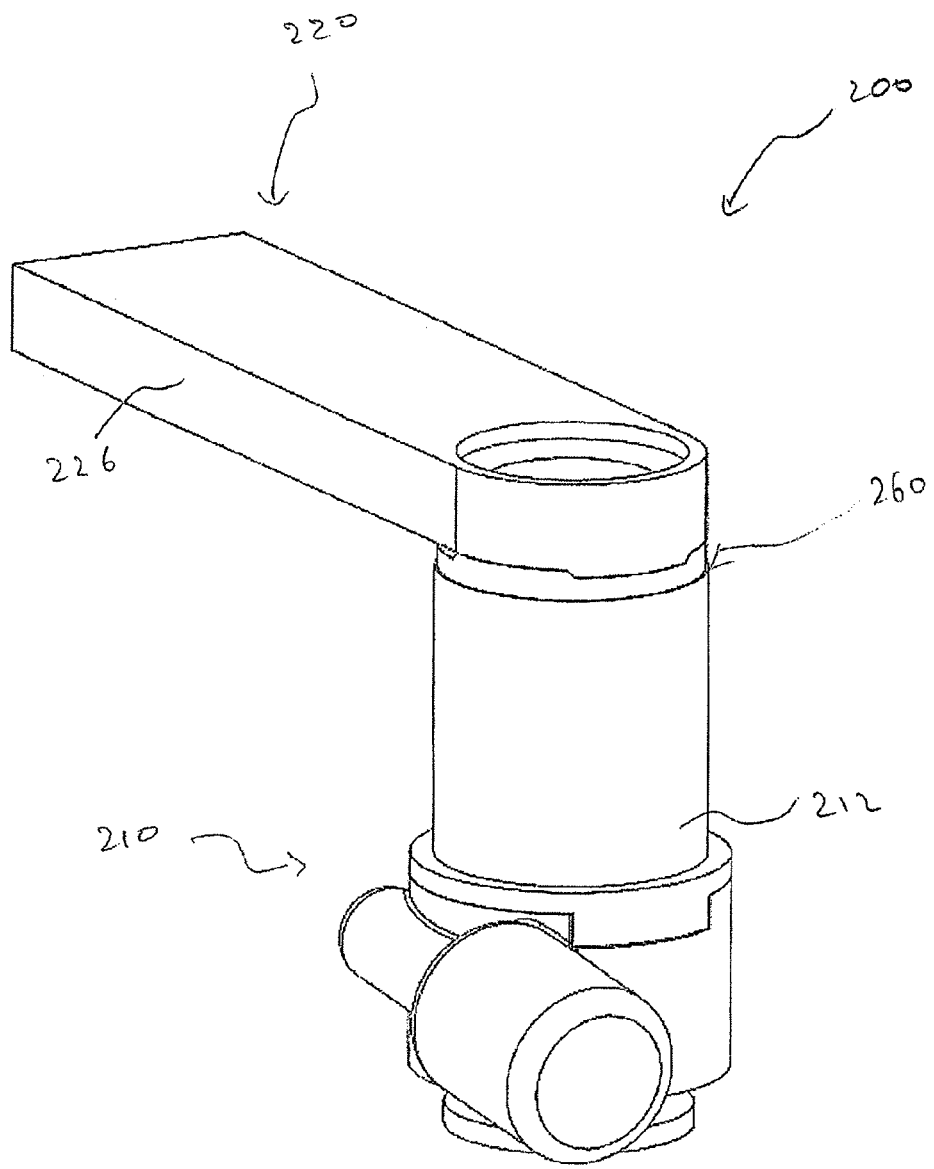
FIG. 14 is a top isometric view of a diagrammatic representation of simplified drive mechanism in a nominal position, according to an embodiment.

Referring now to FIG. 14, where there is shown the simplified drive mechanism 200, which includes a frame base 210, frame arm 220 and clutch coupling 260 where the frame arm 220 and the clutch coupling 260 share the same complimentary detent features as described in the first embodiment. In this Figure and in the following Figures, the drive shaft 250 is shown as a single piece, in practice however, it will be appreciated that it would be desirable to fabricate it in 2 or more pieces. Additionally, this representation shows the drive coupling 240 with gear teeth integrated as a single piece, however, it will be appreciated that it could also be fabricated in 2 or more pieces as shown in the first embodiment 100.

Figure 15:
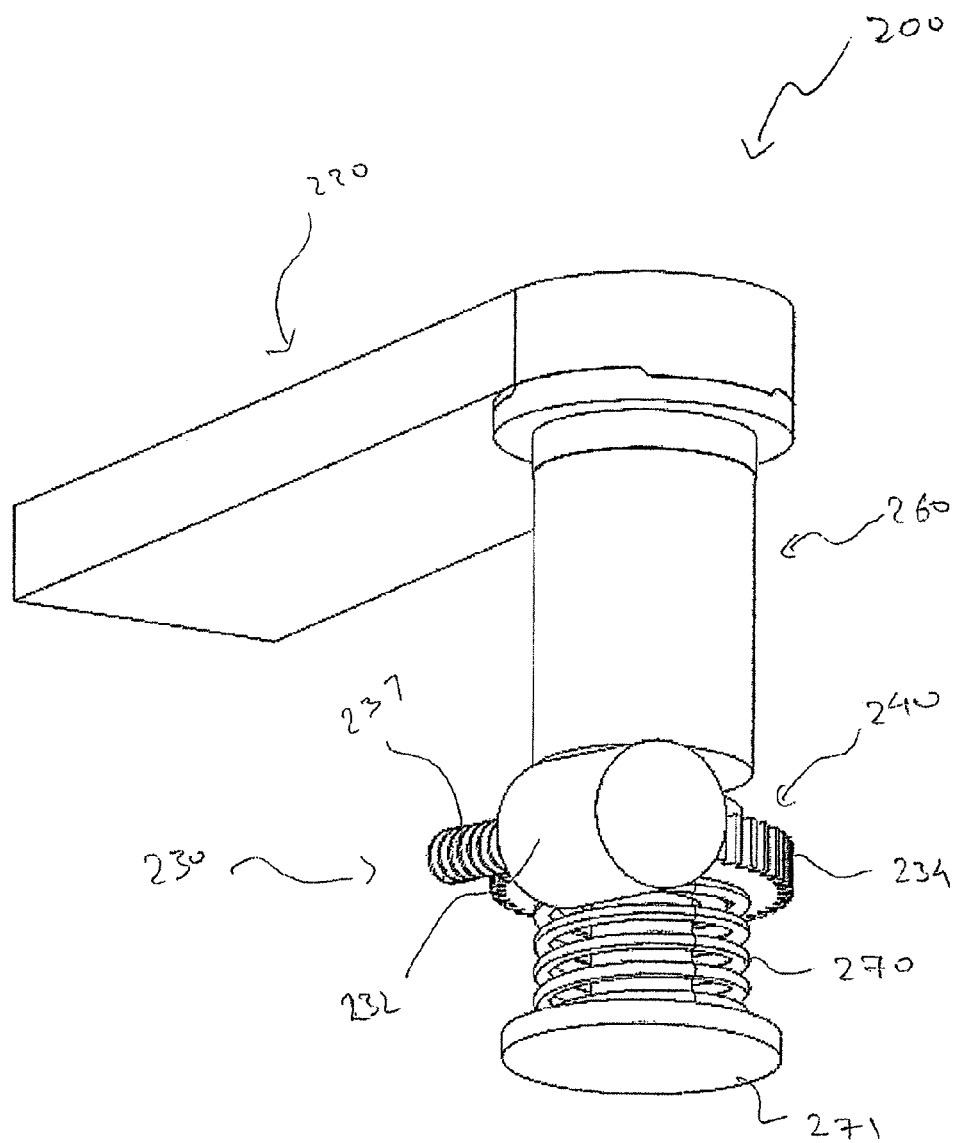
FIG. 15 is a bottom isometric view of a partial assembly of the simplified drive mechanism of FIG. 14.

FIG. 15 shows a partial assembly of the drive mechanism 200, with frame base 210 removed to reveal the powerfold actuator 230, drive coupling 240 and spring 270 which sits between the drive coupling 240 and a spring retainer 271 which forms part of the drive shaft 250. In this representation, the electric motor 232 drives the drive coupling 240 via a worm shaft 237 which engages with the teeth 234 of the drive coupling 240.

Figure 16A:
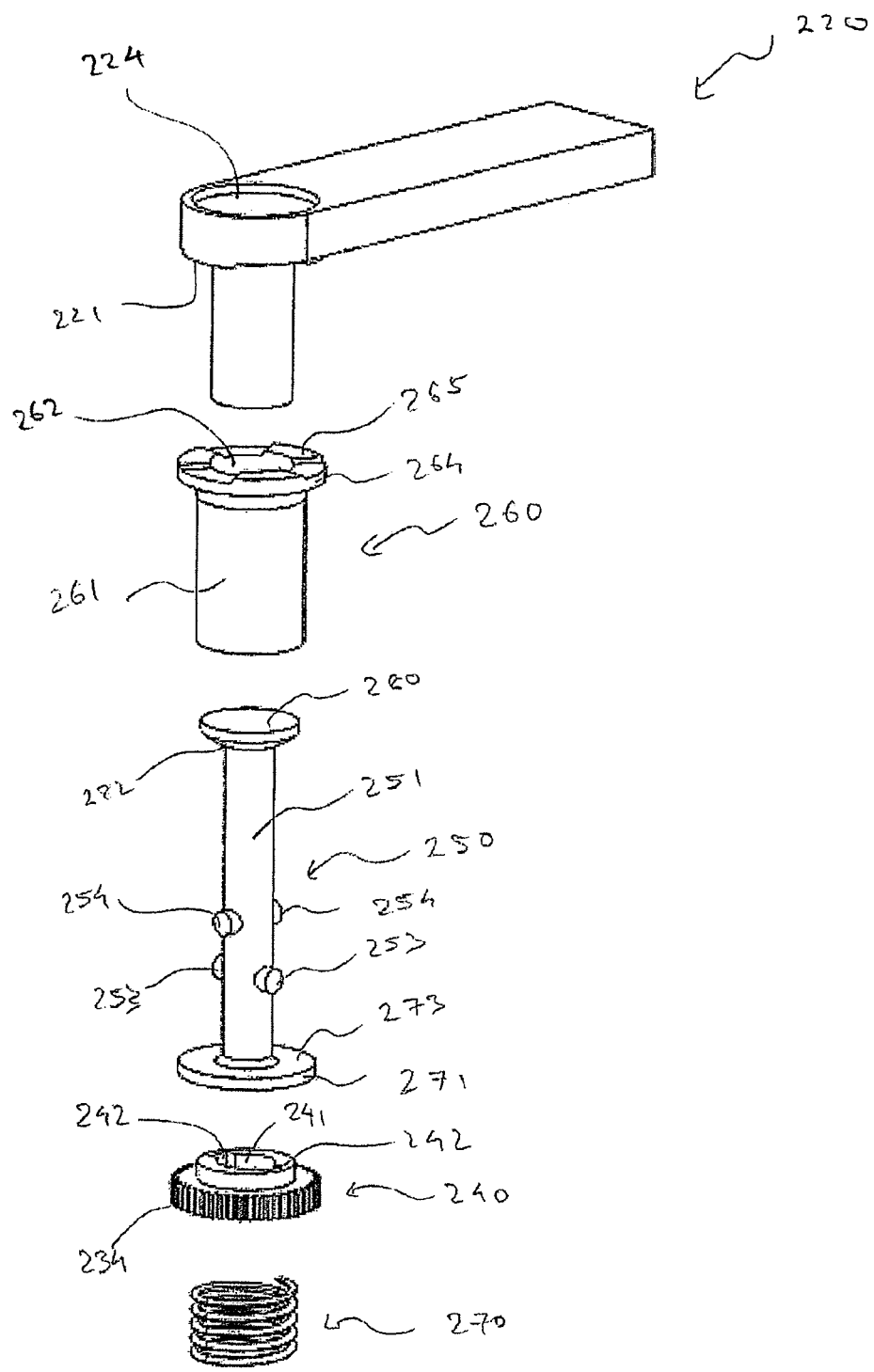
FIG. 16A is a top isometric exploded partial assembly drawing of the drive mechanism of FIG. 14.
Figure 16B:
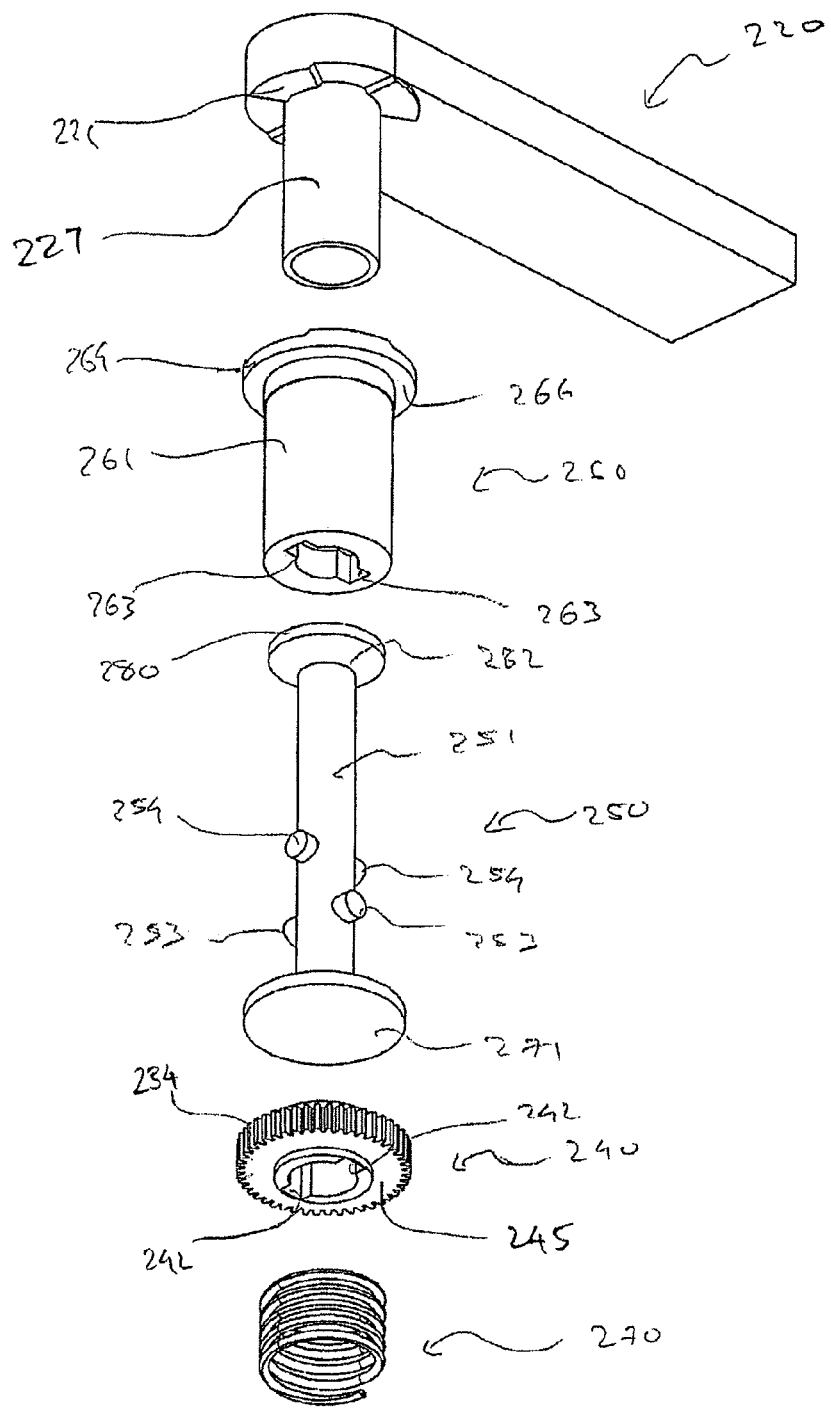
FIG. 16B is a bottom isometric exploded partial assembly drawing of the drive mechanism of FIG. 14.
Figure 17:
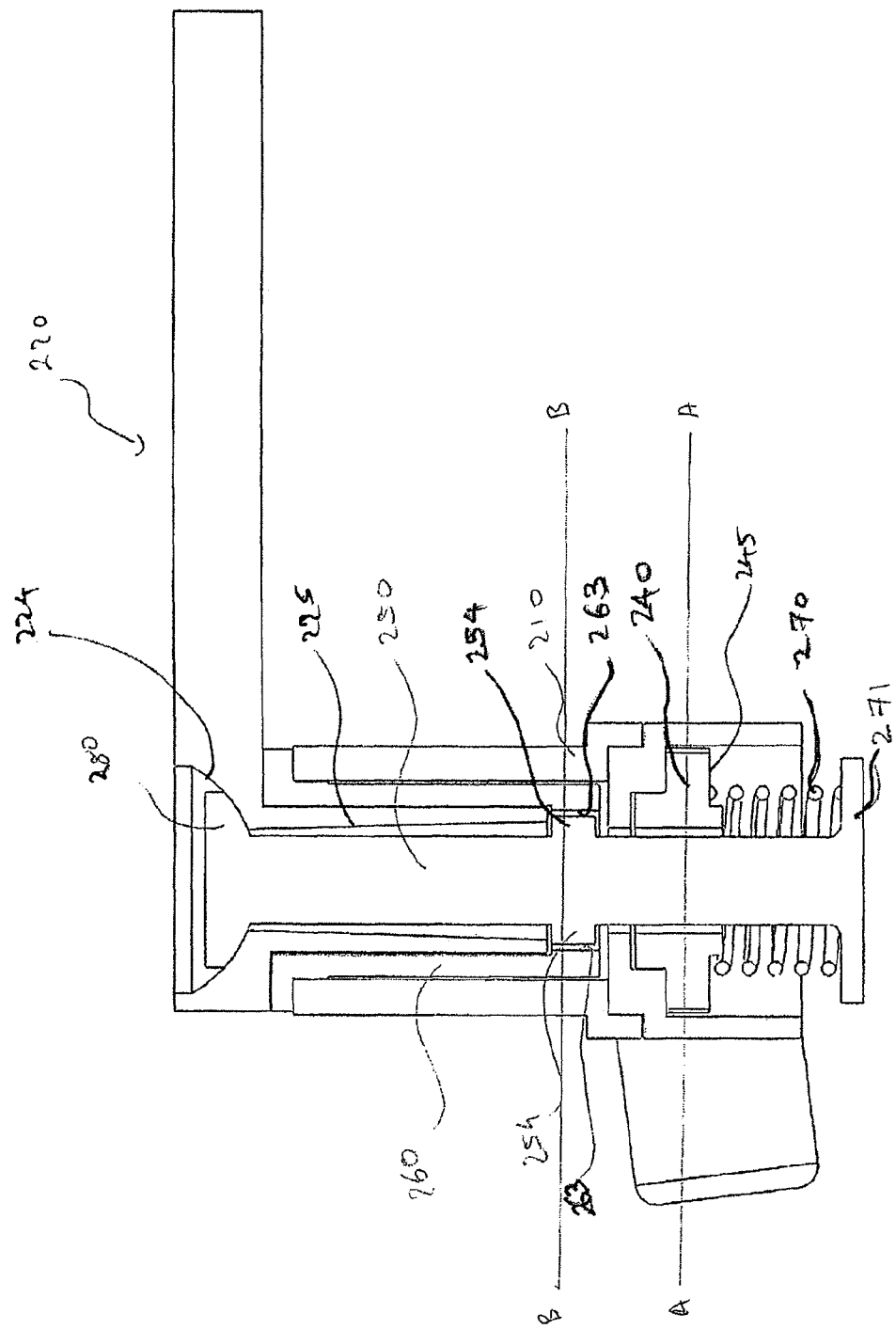
FIG. 17 is a cross sectional view of the simplified drive mechanism of FIG. 14.

Referring now to FIGS. 16A and 16B, where there are shown exploded partial assemblies of the drive mechanism 200, and FIG. 17, where there is shown a cross sectional view of the drive mechanism 200. It will be appreciated that the same drive transfer concepts apply to this embodiment as applied to the first embodiment of the drive mechanism 100.

In this representation of the drive mechanism 200, transfer of rotational drive from the drive coupling 240 to the drive shaft 250 is achieved by virtue of internal opposing slots 242 on the drive coupling 240 and a first pair of external drive dogs 253 on the drive shaft 250. This differs from the external opposing drive dogs 142 and the opposing slots 153 of the first embodiment 100, however it will be appreciated that it has the same effect.

The frame arm 220 features a spherical alignment surface 224 which supports a complimentary spherical surface 282 of the frame arm retainer 280 which forms part of the drive shaft 250, which bears against the alignment surface 224. It will again be appreciated that the drive shaft 250 acts as a tensile member to transmit the force from the spring 270 to pull the frame arm 220 toward the clutch coupling 260, ensuring that the frame arm 220 is stably and precisely located when in the deployed position. When the frame arm 220 is broken away from the clutch coupling 260, the spherical surface 224 of the frame arm 220 bears against the spherical surface 282 of the frame arm retainer 280, which pulls the drive shaft 250, and in turn the spring retaining surface 273 of the spring retainer 271 causing the spring 270 to further compress against the bottom surface 245 of the drive coupling 240.

The spherical joint formed between the two complimentary spherical surfaces 224, 282, plus the tapered bore 225 of the frame arm 220 allows the drive shaft 250 to articulate about the spherical joint.

Figure 18A:
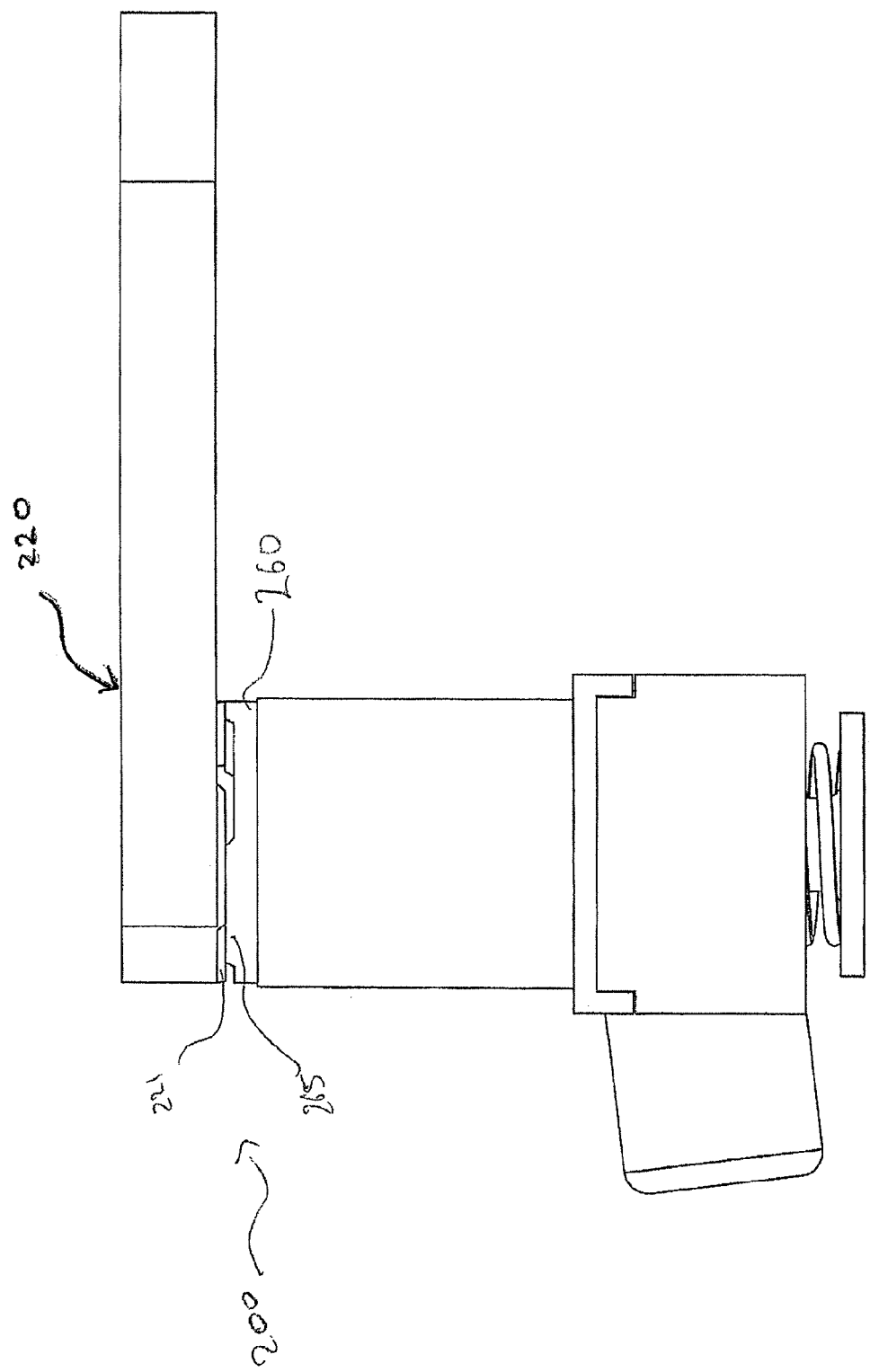
FIG. 18A is a side view of the simplified drive mechanism, showing the frame arm in a broken away position.
Figure 18B:
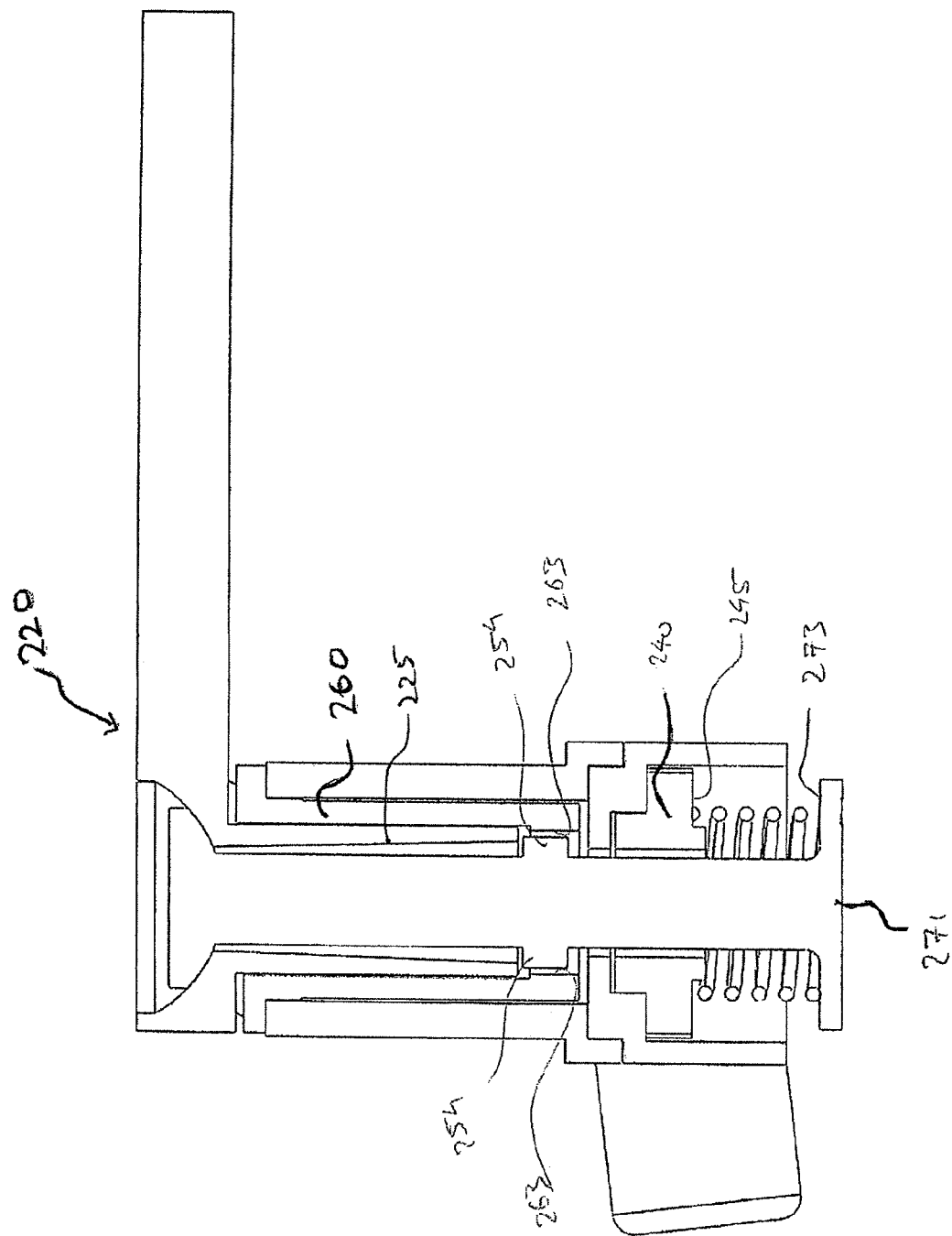
FIG. 18B is a cross sectional view of FIG. 18A, showing the frame arm in a broken away position.

FIG. 18A shows a side view, and FIG. 18B shows a cross sectional view of the drive mechanism 200, where the frame arm 220 and drive shaft 250 are raised in a broken away position such that the detent features 221 of the frame arm 220 are bearing against the top of the detent features 265 of the clutch coupling 260. It will be appreciated that the spring 270 has been further compressed between the spring retaining surface 273 of the spring retainer 271 and the bottom surface 245 of the drive coupling 240. It can also be seen how the recesses 263 in the clutch coupling 260 allow for the second pair of external opposing drive dogs 254 to move axially without interference. It will be appreciated that the slots 242 in the drive coupling 240 also allow for the first pair of external drive dogs 253 to move axially without interference.

Figure 19:
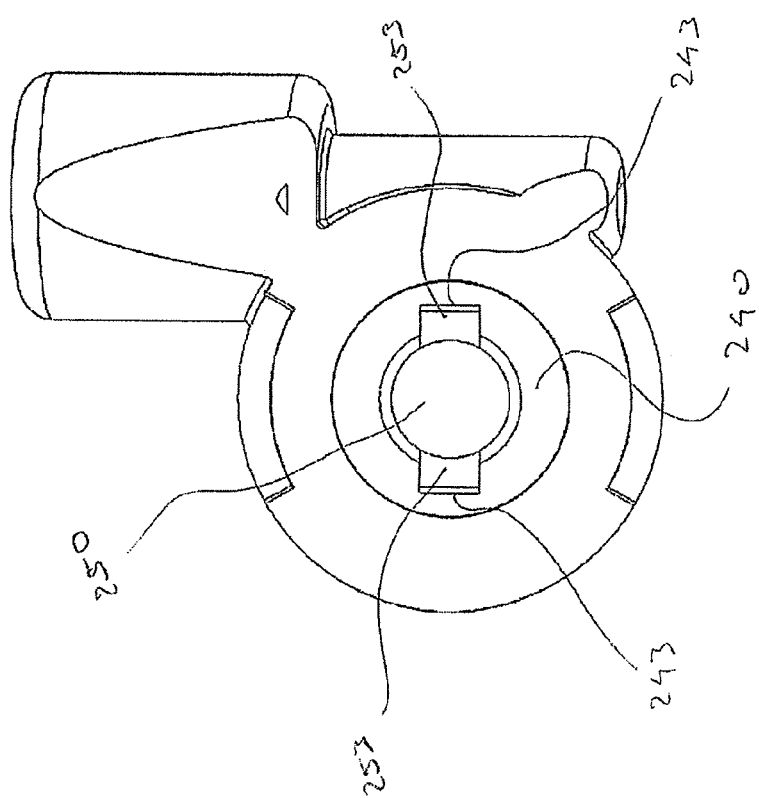
FIG. 19 is a cross sectional view taken through the line A-A of FIG. 17, detailing the clearance relationship between the drive coupling and the drive shaft.

As can be seen in FIG. 19, when the frame arm 220 is in the deployed position, and the frame arm 220, clutch coupling 260, drive shaft 250 and drive coupling 240 all share the same axis of rotation, the first pair of external drive dogs 253 and the internal slots 242 in the drive coupling 240 engage with each other in a first connection such that there is minimal rotational clearance (with respect to the axis of rotation of the drive shaft 250) but with substantial axial clearance (with respect to the axis of rotation of the drive shaft 250), such that the first pair of external drive dogs 253 of the drive shaft can move axially relative to the internal slots 242 of the drive coupling 240, and radial clearance (with respect to the axis of rotation of the drive shaft 250) such that the first pair of external drive dogs 253 of the drive shaft 250 can move transversely along the internal slots 242 of the drive coupling 240. The configuration of the first pair of external drive dogs 253 and the internal slots 242 also allows the drive shaft 250 to pivot conically with respect to the drive coupling 240.

Figure 20:
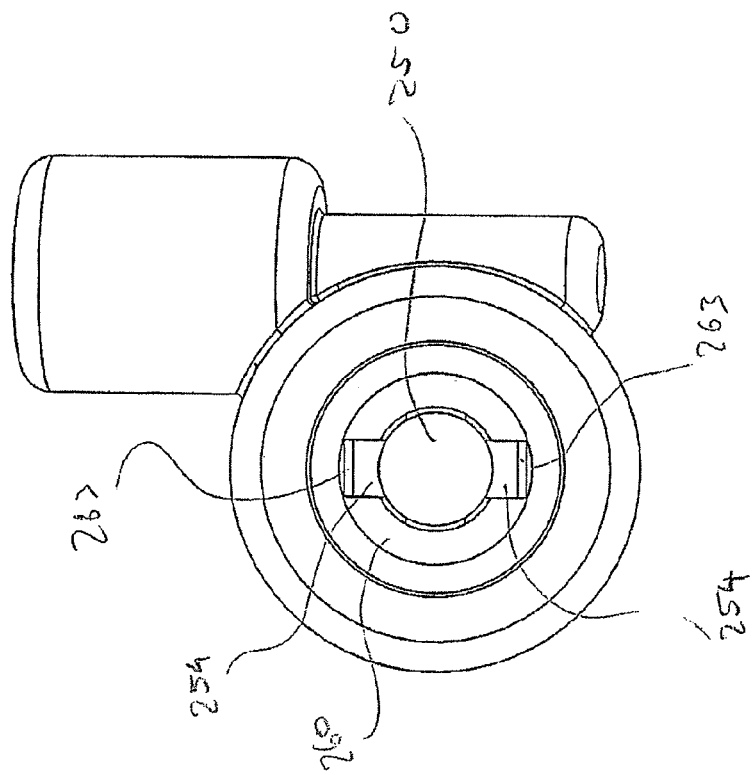
FIG. 20 is a cross sectional view taken through the line B-B of FIG. 17, detailing the clearance relationship between the drive shaft and the clutch coupling.

The degree of axial movement of the drive shaft 250 with respect to the drive coupling 240 is restricted by the compressibility of the spring 270. The degree of radial movement of the drive shaft 250 with respect to the drive coupling 240 is restricted by the clearance between the shaft body 251 and the inner surface of the bore 241 of the drive coupling 240. As can be seen in FIG. 20, the second pair of external drive dogs 254 and the internal recesses 263 in the clutch coupling 260 engage with each other in a second connection such that there is minimal rotational clearance (with respect to the axis of rotation of the drive shaft 250) but with substantial axial clearance (with respect to the axis of rotation of the drive shaft 250), such that the second pair of external drive dogs 254 and the drive shaft 250 can move axially relative to the internal recesses 263 of the clutch coupling 260, and radial clearance (with respect to the axis of rotation of the drive shaft 250) such that the second pair of external drive dogs 254 of the drive shaft 250 can move transversely along the internal recesses 263 of the clutch coupling 260. The configuration of the second pair of external drive dogs 254 and the internal recesses 263 also allows the drive shaft 250 to pivot conically with respect to the axis of rotation of the clutch coupling 260.

The combined effect of the articulated spherical joint and clearances between drive dogs and slots systems, and the orthogonal relationship between the drive dogs and slots systems allows for rotational movement to be transferred from the drive coupling 240 to the frame arm 220 in circumstances where the drive coupling 240, and clutch coupling 260 and frame arm 220 do not share a common axis of rotation.

At any rotation motion angle, the position of the first pair of external opposing drive dogs 253 is determined by the positions of the centre of the drive shaft spherical alignment surface and the internal opposing recesses 263 of the second connection.

At any rotation motion angle, the position of the second pair of external opposing drive dogs 254 is determined by positions of the centre of the drive shaft spherical alignment surface and the internal opposing slots 242 of the first connection.

It will be appreciated that the first and second drive connection sets are preferably, but not exclusively, orthogonal.

It will also be appreciated that clearances between components are provided as to ensure that the drive shaft is free from significant transverse loading which in turn, protects the shaft and powerfold actuator from damaging loads.

Figure 21:
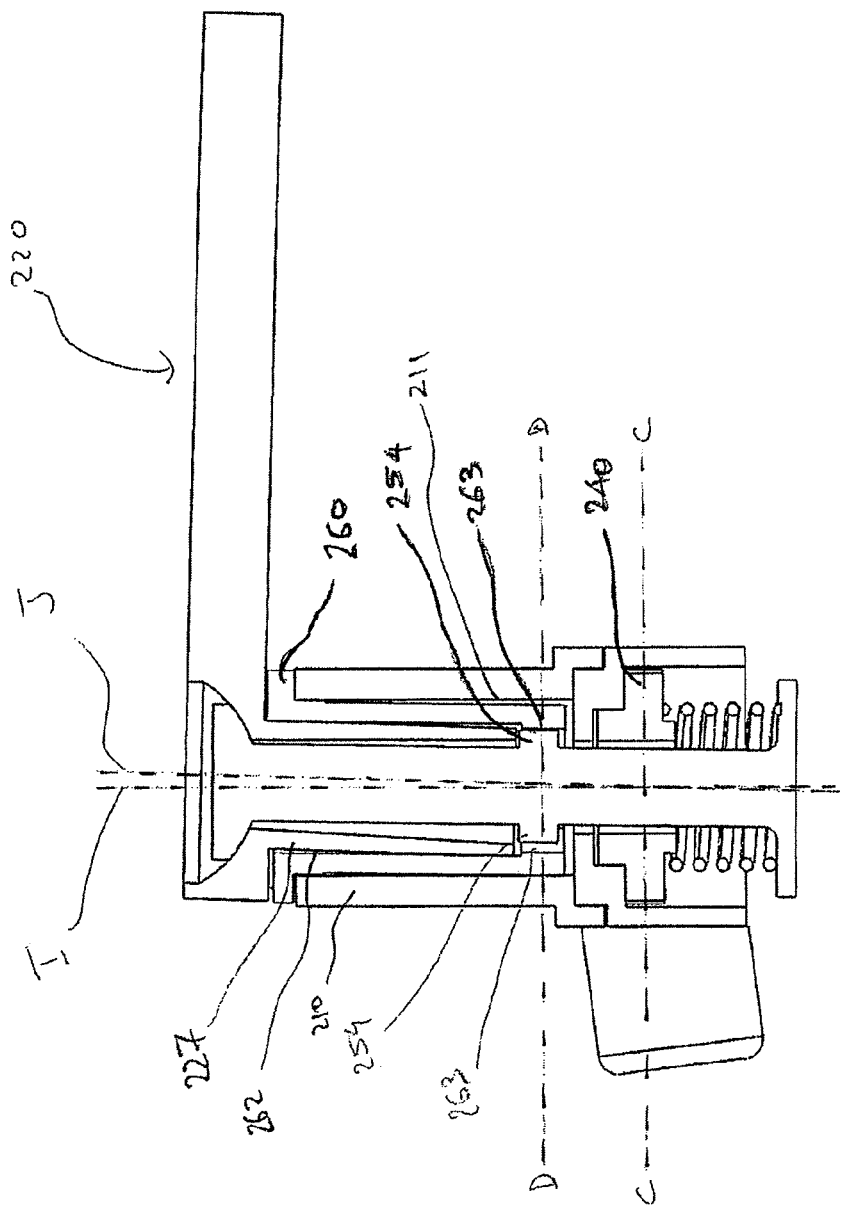
FIG. 21 is a cross sectional view of the simplified drive mechanism of FIG. 14, showing the frame arm, clutch coupling and drive shaft in a displaced position.

Referring now to FIG. 21, where there is shown the simplified drive mechanism 200 showing the frame arm 220, clutch coupling 260 and drive shaft 250 in a displaced position relative to the drive coupling 250, such that the axis of rotation (J) of the frame arm 220 is not aligned with the axis of rotation (I) of the drive coupling 240.

It can be seen how the bore 211 of the frame base 210 accommodates the shaft section 261 of the clutch coupling 260, the shaft section 227 of the frame arm 220 and drive shaft 250. There is an amount of clearance between the clutch coupling 260 and the bore 211, which allows for an amount of relative movement between the clutch coupling 260 and frame base 210.

It can be seen how the clutch coupling 260 has a bore 262 which accommodates the shaft section 227 of the frame arm 220 and the drive shaft 250. There is an amount of clearance between the frame arm 220 and the bore 262, which allows for some relative movement between the frame arm 210 and the clutch coupling 260.

It can be seen how the frame arm 220 has a tapered bore 225 which accommodates the drive shaft 250. The tapered bore 225 allows the drive shaft 250 to articulate relative to the frame arm 220.

As can be seen in FIG. 21, an external force has been applied to the end of the frame arm 220 which has resulted in the frame arm 220 "tipping" and coming into contact with and transferring the external force to the inside of the bore 262 of the clutch coupling 260, the clutch coupling 260 has also tipped and come into contact with the inside of the bore 211 of the frame base, the drive shaft 250 has also articulated with respect to the frame arm 220, clutch coupling 260 and drive coupling 240.

With reference to FIG. 22, it can be seen that the first connection defined by the engagement between the first pair of external drive dogs 253 and the internal opposing slots 242 has allowed the drive shaft 250 to pivot with respect to the drive coupling 240. With reference to FIG. 23, it can be seen that the second connection defined by the engagement between the second pair of external drive dogs 254 and the internal opposing recesses 263 of the clutch coupling 260 has allowed the drive shaft 250 to move radially with respect to the clutch coupling 260.

It will be appreciated, that despite the misalignment between the axis of rotation (I) of the frame arm 220 and the axis of rotation (J) of the drive coupling 240, the drive mechanism 200 is still capable of transferring rotational movement, and that the drive mechanism 200 is capable of absorbing the force from external impacts without transferring it back to the drive coupling 240 and damaging the powerfold actuator 230.

It will also be appreciated that the misalignment between the axis of rotation of the frame arm and the axis of rotation of the drive coupling does not just occur through some external force applied to the frame arm, and can also occur through the use of lower precision components, such as near net shape components.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

It will be appreciated that the drive mechanism can be employed with or without a clutch coupling incorporating detent and ratchet features, and that the transfer of rotational drive from the drive coupling to the frame arm could still be achieved.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

REFERENCE SIGN LIST 100 drive mechanism
110 frame base
111 bore
113 mounting point
114 stop
116 bearing
118 pawls
120 frame arm
121 detent features
122 forward stop surface
123 parked stop surface
124 alignment surface
125 bore
127 shaft section
130 powerfold actuator
132 electric motor
133 main gear
134 teeth
135 bore
136 opposing slots
140 drive coupling
141 bore
142 drive dogs
143 drive dogs
144 top ring
145 bottom surface
146 bottom flange
150 drive shaft
151 shaft body
153 slots
154 drive dogs
155 groove
156 groove
160 clutch coupling
161 shaft section
162 bore
163 recesses
165 detent features
166 bottom surface
167 ratchet features
170 disc spring
171 spring retainer
172 bore
173 top surface
174 circlip
175 drive dogs
180 frame arm retainer
182 alignment surface
183 circlip
200 drive mechanism
210 frame base
211 bore
220 frame arm
221 detent features
224 alignment surface
225 tapered bore
227 shaft section
230 powerfold actuator
232 electric motor
234 teeth
237 worm shaft
240 drive coupling
241 bore
242 slots
245 bottom surface
250 drive shaft
253 drive dogs
254 drive dogs
260 clutch coupling
261 shaft section
262 bore
263 recesses
265 detent features
270 spring
271 spring retainer
273 retaining surface
280 frame arm retainer
282 spherical surface J first axis of rotation
I second axis of rotation

The invention claimed is:

1. A drive mechanism for an external rear view device to be fitted to a motor vehicle, comprising:
a vehicle mountable frame base;
a frame arm, for accommodating the external rear view device, rotatable with respect to the frame base about a first axis;
a drive coupling rotatable with respect to the frame base about a second axis; and
a drive shaft
wherein the drive shaft is operably connected to the drive coupling by a first connection,
wherein the first connection comprises a pair of drive dogs configured to be within a pair of recesses or slots shaped to receive the drive dogs, and wherein rotational drive is transferable between the drive dogs and the recesses or slots, and operably connected to the frame arm by a second connection, wherein the second connection comprises a clutch coupling, which transfers the rotational drive between the drive shaft and the frame arm,
wherein the second connection further comprises a pair of drive dogs configured to be within a pair of recesses or slots shaped to receive the drive dogs, wherein the rotational drive is transferable between the drive dogs and the recesses or slots so that the drive shaft is capable of transferring rotational movement from the drive coupling to the frame arm allowing for rotational movement, the drive coupling, clutch coupling and frame arm do not share a common axis of rotation,
wherein the frame arm and drive shaft are movable so that the first axis and second axis are movable with respect to each other.

2. The drive mechanism of claim 1, wherein the first connection allows the drive shaft to be moveable with respect to the drive coupling.

3. The drive mechanism of claim 1, wherein the pair of drive dogs are disposed on the drive coupling and the pair of recesses and slots are disposed on the drive shaft, or the pair of drive dogs are disposed on the drive shaft and the pair of recesses or slots are disposed on the drive coupling.

4. The drive mechanism of claim 1, wherein the second connection allows the drive shaft to be misaligned with respect to the frame arm.

5. The drive mechanism of claim 1, wherein the pair of drive dogs are disposed on the drive shaft and the pair of recesses or slots are disposed on the clutch coupling, or the pair of drive dogs are disposed on the clutch coupling and the pair of recesses and slots are disposed on the drive shaft.

6. The drive mechanism of claim 1, further comprising a powerfold actuator for creating relative rotation between the drive coupling and the frame base.

7. An external rear view device for a motor vehicle with the drive mechanism of claim 1.

8. The external rear view device of claim 7, wherein the frame arm accommodates a housing for at least one reflective element comprising at least one of a mirror, a camera, or a sensor.

* * * * *